(12) United States Patent
McKiernan et al.

(10) Patent No.: US 9,895,675 B2
(45) Date of Patent: Feb. 20, 2018

(54) SOIL ADSORBING COMPOSITES, COMPOSITIONS AND METHODS FOR USING SAME

(71) Applicant: The Procter & Gamble Company, Cincinnati, OH (US)

(72) Inventors: Robin Lynn McKiernan, Mason, OH (US); Steven Daryl Smith, Mason, OH (US); Robert Joseph McChain, Cincinnati, OH (US); Jamie Lynn Dria, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 23 days.

(21) Appl. No.: 15/079,137

(22) Filed: Mar. 24, 2016

(65) Prior Publication Data

US 2016/0279604 A1     Sep. 29, 2016

Related U.S. Application Data

(60) Provisional application No. 62/139,245, filed on Mar. 27, 2015.

(51) Int. Cl.

| | | |
|---|---|---|
| *B01J 20/06* | (2006.01) | |
| *B01J 20/26* | (2006.01) | |
| *B01J 20/10* | (2006.01) | |
| *B01J 20/28* | (2006.01) | |
| *B01J 20/30* | (2006.01) | |
| *D21H 27/08* | (2006.01) | |
| *D21H 17/37* | (2006.01) | |
| *D21H 21/22* | (2006.01) | |

(52) U.S. Cl.
CPC ............ *B01J 20/261* (2013.01); *B01J 20/06* (2013.01); *B01J 20/103* (2013.01); *B01J 20/28011* (2013.01); *B01J 20/28016* (2013.01); *B01J 20/3021* (2013.01); *B01J 20/3085* (2013.01); *D21H 17/37* (2013.01); *D21H 21/22* (2013.01); *D21H 27/08* (2013.01); *B01J 2220/4831* (2013.01)

(58) Field of Classification Search
CPC .............................. B01J 20/06; B01J 20/261
USPC ....................................................... 502/402
See application file for complete search history.

(56) References Cited

U.S. PATENT DOCUMENTS

| | | |
|---|---|---|
| 2013/0055517 A1 | 3/2013 | McKiernan et al. |
| 2013/0059766 A1 | 3/2013 | McKiernan et al. |
| 2013/0059997 A1 | 3/2013 | Smith et al. |
| 2014/0090850 A1 | 4/2014 | Benicewicz et al. |

OTHER PUBLICATIONS

PCT International Search Report dated Jun. 24, 2016—4 pages.
All Office Actions U.S. Appl. No. 15/079,128.

*Primary Examiner* — Edward Johnson
(74) *Attorney, Agent, or Firm* — C. Brant Cook

(57) ABSTRACT

Soil adsorbing composites, and more particularly to soil adsorbing composites that exhibit improved (lower values) Backscattering Values as measured according to the Soil Flocculation and Settling Test Method described herein compared to non-soil adsorbing composites (such as particulate materials, for example silica and/or pulp fibers, that are not associated with a soil adsorbing polymer), soil adsorbing compositions containing same, processes for making same, and methods for using same.

12 Claims, No Drawings

SOIL ADSORBING COMPOSITES, COMPOSITIONS AND METHODS FOR USING SAME

FIELD OF THE INVENTION

The present invention relates to soil adsorbing composites, and more particularly to soil adsorbing composites that exhibit improved (lower values) Backscattering Values as measured according to the Soil Flocculation and Settling Test Method described herein compared to non-soil adsorbing composites (such as particulate materials, for example silica and/or pulp fibers, that are not associated with a soil adsorbing polymer), soil adsorbing compositions comprising same, processes for making same, and methods for using same.

BACKGROUND OF THE INVENTION

The in situ separation and/or removal of soils from liquids, such as aqueous solutions, for example wash waters during and/or after laundering clothes, and/or simply water, such as drinking water, has been challenging for formulators and/or consumers. In the past, certain common soils, such as black todd clay soils, form a colloidal suspension within the liquids, for example water, and may eventually settle when left to stand for an inordinate amount of time, for example a consumer unacceptable amount of time, and/or may redeposit on the clothes or other articles within the liquids.

One known technology for cleaning water is neat polyacrylamide in solid form, not a composite, for example without a particulate material and/or other solid carrier. Accordingly, when the polyacrylamide, which is water-soluble, is added to water in a container, such as a bucket, the polyacrylamide dissolves, flocculates soil within the water, and then settles to the bottom of the water container. One problem with this technology is the fact that the polyacrylamide dissolves in the water, which in some applications, such as laundering clothes, would result in the polyacrylamide adsorbing onto the clothes being laundered and thus resulting in dingy, dirty clothes as a result of soils depositing and/or redepositing, with the aid of the soluble polyacrylamide, onto the clothes.

One problem faced by formulators is how to remove and/or separate soils in situ from a liquid, such as water, in a consumer desirable amount time and keep the soil separate from any articles, such as clothes, present in the liquid.

Accordingly, there is a need a material, such as a soil adsorbing composite and/or a method for in situ separation and/or removal of soils from liquids, such as aqueous solutions, that overcome the negatives set forth above.

SUMMARY OF THE INVENTION

The present invention fulfills the need described above by providing a material, for example a soil adsorbing composite, and a method for separating and/or removing soil, for example black todd clay, from liquids, for example aqueous solutions, such as wash waters.

One solution to the problem identified above is to provide a soil adsorbing composite comprising one or more soil adsorbing polymers, which are associated, with one or more particulate materials or with themselves in the form of a polar solvent-insoluble, such as water-insoluble, polymer particle, such that the soil adsorbing composites remove and/or separate soils in situ from a liquid, such as water, in a consumer desirable amount of time and keep the soil separate from any articles, such as clothes, present in the liquid In one example of the present invention, a soil adsorbing composite comprising a soil adsorbing polymer and/or two or more soil adsorbing polymers, wherein the soil adsorbing composite exhibits a Backscattering Value of less than 14% and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method as described herein, is provided.

In another example of the present invention, a soil adsorbing composite comprising a soil adsorbing polymer and/or two or more soil adsorbing polymers, wherein the soil adsorbing composite exhibits a density of greater than 1 g/cm$^3$, is provided.

In another example of the present invention, a soil adsorbing composite comprising a particulate material, for example an inorganic particulate material, such as silica, and a soil adsorbing polymer, is provided.

In another example of the present invention, a soil adsorbing composite comprising a particulate material, for example an organic particulate material, such as wood pulp fiber, and a soil adsorbing polymer, is provided.

In another example of the present invention, a soil adsorbing composite comprising a particulate material, such as silica and/or wood pulp fiber, and a soil adsorbing polymer, wherein the soil adsorbing composite exhibits a Backscattering Value of less than 14% and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method described herein, is provided. In another example of the present invention, a soil adsorbing composite comprising a particulate material, such as silica and/or wood pulp fiber, and a soil adsorbing polymer, wherein the soil adsorbing composite exhibits a density of greater than 1 g/cm$^3$, is provided.

In even another example of the present invention, a soil adsorbing composition comprising a soil adsorbing composite and/or two or more different soil adsorbing composites according to the present invention and a surfactant, is provided.

In even another example of the present invention, a soil adsorbing composition comprising a soil adsorbing composite and/or two or more different soil adsorbing composites according to the present invention and a surfactant such that the soil adsorbing composition exhibits a Backscattering Value of less than 14% and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method described herein, is provided.

In even still another example of the present invention, a soil adsorbing composition comprising a soil adsorbing composite and/or two or more different soil adsorbing composites according to the present invention and a bleaching agent, such as chlorine, is provided.

In even still another example of the present invention, a soil adsorbing composition comprising a soil adsorbing composite and/or two or more different soil adsorbing composites according to the present invention and a bleaching agent, such as chlorine, such that the soil adsorbing composition exhibits a Backscattering Value of less than 14% after and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method described herein, is provided.

In even still yet another example of the present invention, a soil adsorbing composition comprising a soil adsorbing composite and/or two or more different soil adsorbing composites according to the present invention and a flavoring agent, is provided.

In even still yet another example of the present invention, a soil adsorbing composition comprising a soil adsorbing composite and/or two or more different soil adsorbing composites according to the present invention and a flavoring agent, such that the soil adsorbing composition exhibits a Backscattering Value of less than 14% and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method described herein, is provided.

In still another example of the present invention, a soil adsorbing composition comprising a soil adsorbing composite and/or two or more different soil adsorbing composites according to the present invention and a coloring agent, such as a hueing dye, is provided.

In still another example of the present invention, a soil adsorbing composition comprising a soil adsorbing composite and/or two or more different soil adsorbing composites according to the present invention and a coloring agent, such as a hueing dye, such that the soil adsorbing composition exhibits a Backscattering Value of less than 14% and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method described herein, is provided.

In even another example of the present invention, a soil adsorbing composition comprising a soil adsorbing composite and/or two or more different soil adsorbing composites according to the present invention and a odor control agent, such as activated charcoal, is provided.

In even another example of the present invention, a soil adsorbing composition comprising a soil adsorbing composite and/or two or more different soil adsorbing composites according to the present invention and a odor control agent, such as activated charcoal, such that the soil adsorbing composition exhibits a Backscattering Value of less than 14% and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method described herein, is provided.

In even another example of the present invention, a soil adsorbing composition comprising a soil adsorbing composite and/or two or more different soil adsorbing composites according to the present invention and a odor control agent, such as activated charcoal and/or cyclodextrin, such that the soil adsorbing composition exhibits a Backscattering Value of less than 14% and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method described herein, is provided.

In another example of the present invention, a method for separating soil from a liquid, for example an aqueous solution, such as a wash water, the method comprising the step of: adding a soil adsorbing composite, according to the present invention, to a liquid, and optionally filtering the liquid to remove the soil adsorbing composite and its associated soil, is provided. In another example of the present invention, a method for separating soil from a liquid, for example an aqueous solution, such as a wash water, the method comprising the step of: adding a soil adsorbing composition according to the present invention, optionally filtering the liquid to remove the soil adsorbing composite and its associated soil, is provided.

The present invention provides novel soil adsorbing composites, soil adsorbing compositions, and method for using same that provide improved ability to separate and/or remove soil, especially in-situ, from liquids.

DETAILED DESCRIPTION OF THE INVENTION

Definitions

"Soil Adsorbing Composite" as used herein means a particle, for example a polar solvent-insoluble, such as water-insoluble, particle, that comprises a soil adsorbing polymer. In one example, the soil adsorbing composite, for example a polar solvent-insoluble, such as water-insoluble, soil adsorbing composite, may consist of a polymer particle, for example a polymer particle comprising greater than 50% and/or greater than 75% and/or greater than 90% and/or greater than 95% and/or about 100% by weight of a soil adsorbing polymer. In one example, the soil adsorbing composite is in the form of a polymer particle comprising a crosslinked polymer, for example a crosslinked soil adsorbing polymer polymerized together with an uncrosslinked soil adsorbing polymer.

"Associated" or "associated with" as used herein for example with respect to a soil adsorbing composite's soil adsorbing polymer being associated with a particulate material, such as silica and/or pulp fiber, means that the soil adsorbing polymer and particulate material of the soil adsorbing composite are in direct contact with each other and/or in intimate contact with each other, for example, one coated on the other and/or both entangled with each other.

"Monomeric unit" as used herein is a constituent unit (sometimes referred to as a structural unit) of a polymer.

"Nonionic monomeric unit" as used herein means a monomeric unit that exhibits no net charge at a pH of 7 and/or is identified as a nonionic monomeric unit herein. A nonionic monomeric unit may be derived from a nonionic monomer.

"Nonionic monomer" as used herein means a monomer that exhibits no net charge at a pH of 7 and/or is identified as a nonionic monomer herein.

"Anionic monomeric unit" as used herein means a monomeric unit that exhibits a net negative charge at a pH of 7 and/or is identified as an anionic monomeric unit herein. An anionic monomeric unit may be derived from an anionic monomer. An anionic monomeric unit is generally associated with one or more protons or cations such as cations of alkali metal or alkaline earth metal, for example sodium of cationic groups such as ammonium.

"Anionic monomer" as used herein means a monomer that exhibits a net negative charge at a pH of 7 and/or is identified as an anionic monomer herein. An anionic monomer is generally associated with one or more cations such as protons or cations of alkali metal or alkaline earth metal, for example sodium of cationic groups such as ammonium.

"Cationic monomeric unit" as used herein means a monomeric unit that exhibits a net positive charge at a pH of 7 and/or is identified as a cationic monomeric unit herein. A cationic monomeric unit may be derived from a cationic monomer. A cationic monomeric unit is generally associated with one or more anions such as a chloride ion, a bromide ion, a sulfonate group and/or a methyl sulfate group.

"Cationic monomer" as used herein means a monomer that exhibits a net positive charge at a pH of 7 and/or is identified as a cationic monomer herein. A cationic monomer is generally associated with one or more anions such as a chloride ion, a bromide ion, a sulfonate group and/or a methyl sulfate group.

"Zwitterionic monomeric unit" as used herein means a monomeric unit that exhibits both a negative charge and a positive charge on the same monomeric unit at a pH of 7 and/or is identified as a zwitterionic monomeric unit herein. A zwitterionic monomeric unit may be derived from a zwitterionic monomer. A zwitterionic monomeric unit is generally associated with one or more protons or cations such as cations of alkali metal or alkaline earth metal, for example sodium or cationic groups such as ammonium and one or more anions such as a chloride ion, a bromide ion, a sulfonate group and/or a methyl sulfate group.

"Zwitterionic monomer" as used herein means a monomer that exhibits both a negative charge and a positive charge on the same monomer at a pH of 7 and/or is identified as a zwitterionic monomeric unit herein. A zwitterionic monomer is generally associated with one or more protons or cations such as cations of alkali metal or alkaline earth metal, for example sodium or cationic groups such as ammonium and one or more anions such as a chloride ion, a bromide ion, a sulfonate group and/or a methyl sulfate group.

"Soil adsorbing polymer" as used herein means a homopolymer or a polymer comprising two or more different monomeric units such as a copolymer or terpolymer that exhibits a soil adsorption value of at least 38 mg as measured according to Soil Adsorption Test Method described herein.

Soil Adsorbing Composites

In one example, the soil adsorbing composites of the present invention comprise one or more soil adsorbing polymers that are associated with one or more particulate materials, such as an inorganic material, for example silica, and/or an organic material, such as wood pulp fibers.

In another example, the soil adsorbing composites of the present invention comprise one or more soil adsorbing polymers that associate with one another or themselves, for example by crosslinking with themselves, such that a polymer particle, for example a soil adsorbing polymer particle, is formed. In one example, the soil adsorbing composite may comprise a soil adsorbing polymer that has been crosslinked to itself with a suitable crosslinking agent. Non-limiting examples of suitable crosslinking agents include bi- or polyfunctional vinyl monomers including by way of illustration and not limitation, allyl methacrylate; triethylene glycol dimethacrylate; ethylene glycol dimethacrylate, diethylene glycol dimethacrylate, aliphatic or aromatic urethane diacrylates, difunctional urethane acrylates, ethoxylated aliphatic difunctional urethane methacrylates, aliphatic or aromatic urethane dimethacrylates, epoxy acrylates, epoxymethacrylates; tetraethylene glycol dimethacrylate; polyethylene glycol dimethacrylate; 1,3 butylene glycol diacrylate; 1,4-butanediol dimethacrylate; 1,4-butanediol diacrylate; diethylene glycol diacrylate; 1,6 hexanediol diacrylate; 1,6 hexanediol dimethacrylate; neopentyl glycol diacrylate; polyethylene glycol diacrylate; tetraethylene glycol diacrylate; triethylene glycol diacrylate; 1,3 butylene glycol dimethacrylate; tripropylene glycol diacrylate;

ethoxylated bisphenol diacrylate; ethoxylated bisphenol dimethylacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate, divinyl benzene, and mixtures thereof.

The soil adsorbing composites of the present invention may exhibit a Backscattering Value of less than 14% and/or less than 13.5% and/or less than 13% and/or less than 12% and/or less than 11% and/or less than 10% and/or greater than 0% and/or greater than 1% and/or from less than 14% to about 6% and/or from about 13.5% to about 7% and/or from about 13% to about 8% and/or from about 10% to about 8% after 2 minutes and/or less than 15% and/or less than 14% and/or less than 13% and/or less than 12% and/or less than 11% and/or less than 10% and/or greater than 0% and/or greater than 1% and/or from less than 15% to about 6% and/or from about 14% to about 7% and/or from about 13% to about 8% and/or from about 10% to about 8% after 1 minute as measured according to the Soil Flocculation and Settling Test Method described herein.

Monomers Capable of Forming a Soil Adsorbing Polymer

The soil adsorbing polymers of the present invention may comprise one or more monomeric units. In one example, the soil adsorbing polymer comprises a homopolymer. In another example the soil adsorbing polymer comprises two or more different monomeric units, for example the soil adsorbing polymer comprises a copolymer. In such an example, the soil adsorbing polymers can be referred to as copolymers including terpolymers and higher rather than homopolymers, which consist of a single type of monomeric unit. In one example, the soil adsorbing polymers of the present invention may be a terpolymer (3 different types of monomeric units). The soil adsorbing composites of the present invention may be a random copolymer. In another example, the soil adsorbing composites of the present invention may be a charged homopolymer.

In one example, a soil adsorbing polymer of the present invention comprises two or more monomeric units selected from the group consisting of: a. nonionic monomeric units; b. anionic monomeric units; c. cationic monomeric units; d. zwitterionic monomeric units; and e. mixtures thereof.

a. Nonionic Monomeric Units

The nonionic monomeric units may be selected from the group consisting of: nonionic hydrophilic monomeric units, nonionic hydrophobic monomeric units, and mixtures thereof.

Non-limiting examples of nonionic hydrophilic monomeric units suitable for the present invention include nonionic hydrophilic monomeric units derived from nonionic hydrophilic monomers selected from the group consisting of: hydroxyalkyl esters of $\alpha,\beta$-ethylenically unsaturated acids, such as hydroxyethyl or hydroxypropyl acrylates and methacrylates, glyceryl monomethacrylate, $\alpha,\beta$-ethylenically unsaturated amides such as acrylamide, N,N-dimethylmethacrylamide, N-methylolacrylamide, $\alpha,\beta$-ethylenically unsaturated monomers bearing a water-soluble polyoxyalkylene segment of the poly(ethylene oxide) type, such as poly(ethylene oxide) $\alpha$-methacrylates (Bisomer S20W, S10W, etc., from Laporte) or $\alpha,\omega$-dimethacrylates, Sipomer BEM from Rhodia ($\omega$-behenyl polyoxyethylene methacrylate), Sipomer SEM-25 from Rhodia ($\omega$-tristyrylphenyl polyoxyethylene methacrylate), $\alpha,\beta$-ethylenically unsaturated monomers which are precursors of hydrophilic units or segments, such as vinyl acetate, which, once polymerized, can be hydrolyzed in order to give rise to vinyl alcohol units or polyvinyl alcohol segments, vinylpyrrolidones, $\alpha,\beta$-ethylenically unsaturated monomers of the ureido type, and in particular 2-imidazolidinone-ethyl methacrylamide (Sipomer WAM II from Rhodia), and mixtures thereof. In one example, the nonionic hydrophilic monomeric unit is derived from acrylamide. In another example, the nonionic hydrophilic monomeric unit is derived from acrylamide, dimethyl acrylamide, other substituted acrylamides, methacrylamides, and mixtures thereof.

Non-limiting examples of nonionic hydrophobic monomeric units suitable for the present invention include nonionic hydrophobic monomeric units derived from nonionic hydrophobic monomers selected from the group consisting of: vinylaromatic monomers such as styrene, alpha-methylstyrene, vinyltoluene, vinyl halides or vinylidene halides, such as vinyl chloride, vinylidene chloride, $C_1$-$C_{12}$ alkylesters of $\alpha,\beta$-monoethylenically unsaturated acids such as methyl, ethyl or butyl acrylates and methacrylates, 2-ethylhexyl acrylate, vinyl esters or allyl esters of saturated carboxylic acids, such as vinyl or allyl acetates, propionates, versatates, stearates, $\alpha,\beta$-monoethylenically unsaturated nitriles containing from 3 to 12 carbon atoms, such as acrylonitrile, methacrylonitrile, $\alpha$-olefins such as ethylene, conjugated dienes, such as butadiene, isoprene, chloroprene, and mixtures thereof.

b. Anionic Monomeric Units

Non-limiting examples of anionic monomeric units suitable for the present invention include anionic monomeric units derived from anionic monomers selected from the group consisting of: monomers having at least one carboxylic function, for instance $\alpha,\beta$-ethylenically unsaturated carboxylic acids or the corresponding anhydrides, such as acrylic, methacrylic or maleic acids or anhydrides, fumaric acid, itaconic acid, N-methacroylalanine, N-acryloylglycine, and their water-soluble salts, monomers that are precursors of carboxylate functions, such as tert-butyl acrylate, which, after polymerization, give rise to carboxylic functions by hydrolysis, monomers having at least one sulfate or sulfonate function, such as 2-sulfooxyethyl methacrylate, vinylbenzene sulfonic acid, allyl sulfonic acid, 2-acrylamido-2-methylpropane sulfonic acid (AMPS), sulfoethyl acrylate or methacrylate, sulfopropyl acrylate or methacrylate, and their water-soluble salts, monomers having at least one phosphonate or phosphate function, such as vinylphosphonic acid, etc., the esters of ethylenically unsaturated phosphates, such as the phosphates derived from hydroxyethyl methacrylate (Empicryl 6835 from Rhodia) and those derived from polyoxyalkylene methacrylates, and their water-soluble salts, and 2-carboxyethyl acrylate (CEA), and mixtures thereof. In one example, the anionic monomeric unit is derived from an anionic monomer selected from the group consisting of: acrylic acid, AMPS, CEA, and mixtures thereof. In another example, the anionic monomeric unit is derived from acrylic acid.

c. Cationic Monomeric Units

Non-limiting examples of cationic monomeric units suitable for the present invention include cationic monomeric units derived from cationic monomers selected from the group consisting of: N,N-(dialkylamino-$\omega$-alkyl)amides of $\alpha,\beta$-monoethylenically unsaturated carboxylic acids, such as N,N-dimethylaminomethylacrylamide or -methacrylamide, 2-(N,N-dimethylamino)ethylacrylamide or -methacrylamide, 3-(N,N-dimethylamino)propylacrylamide or -methacrylamide, and 4-(N,N-dimethylamino)butylacrylamide or -methacrylamide, α,β-monoethylenically unsaturated amino esters such as 2-(dimethylamino)ethyl acrylate (DMAA), 2-(dimethylamino)ethyl methacrylate (DMAM), 3-(dimethylamino)propyl methacrylate, 2-(tert-butylamino)ethyl methacrylate, 2-(dipentylamino)ethyl methacrylate, and 2(diethylamino)ethyl methacrylate, vinylpyridines, vinylamine, vinylimidazoles, vinylimidazolines, monomers that are precursors of amine functions such as N-vinylformamide, N-vinylacetamide, which give rise to primary amine functions by simple acid or base hydrolysis, acryloyl- or acryloyloxyammonium monomers such as trimethylammonium propyl methacrylate chloride, trimethylammonium ethylacrylamide or -methacrylamide chloride or bromide, trimethylammonium butylacrylamide or -methacrylamide methyl sulfate, trimethylammonium propylmethacrylamide methyl sulfate, (3-methacrylamidopropyl)trimethylammonium chloride (MAPTAC), (3-methacrylamidopropyl)trimethylammonium methyl sulphate (MAPTA-MES), (3-acrylamidopropyl)trimethylammonium chloride (APTAC), methacryloyloxyethyl-trimethylammonium chloride or methyl sulfate, and acryloyloxyethyltrimethylammonium chloride; 1-ethyl-2-vinylpyridinium or 1-ethyl-4-vinylpyridinium bromide, chloride or methyl sulfate; N,N-dialkyl-diallylamine monomers such as N,N-dimethyldiallylammonium chloride (DADMAC); polyquaternary monomers such as dimethylaminopropylmethacrylamide chloride and N-(3-chloro-2-hydroxypropyl)trimethylammonium (DIQUAT or DQ) and 2-hydroxy-$N^1$-(3-(2((3-methacrylamidopropyl)dimethylamino)-acetamido)propyl)-$N^1$, $N^1$, $N^3$, $N^3$, $N^3$-pentamethylpropane-1,3-diaminium chloride (TRIQUAT or TQ), and mixtures thereof. In one example, the cationic monomeric unit comprises a quaternary ammonium monomeric unit, for example a monoquaternary ammonium monomeric unit, a diquaternary ammonium monomeric unit and a triquaternary monomeric unit. In one example, the cationic monomeric unit is derived from MAPTAC. In another example, the cationic monomeric unit is derived from DADMAC. In still another example, the cationic monomeric unit is derived from TQ.

In one example, the cationic monomeric units are derived from cationic monomers selected from the group consisting of: dimethylaminoethyl (meth)acrylate, dimethylaminopropyl (meth)acrylate, di-tert-butylaminoethyl (meth)acrylate, dimethylaminomethyl (meth)acrylamide, dimethylaminopropyl (meth)acrylamide, ethylenimine, vinylamine, 2-vinylpyridine, 4-vinylpyridine and vinyl imidazole, for example quaternary vinyl imidazole, and mixtures thereof.

In another example, the cationic monomeric units are derived from cationic monomers selected from the group consisting of: trimethylammonium ethyl (meth)acrylate bromide, chloride or methyl sulfate, trimethylammonium ethyl (meth)acrylate bromide, chloride or methyl sulfate, trimethylammonium ethyl (meth)acrylate bromide, chloride or methyl sulfate, dimethylaminoethyl (meth)acrylate benzyl chloride, 4-benzoylbenzyl dimethylammoniumethyl (meth) acrylate bromide, chloride or methyl sulfate, trimethylammonium ethyl (meth)acrylamido bromide, chloride, or methyl sulfate, trimethylammonium propyl (meth)acrylamido bromide, chloride, or methyl sulfate, vinyl benzyl trimethyl ammonium bromide, chloride or methyl sulfate, diallyldimethyl ammonium chloride, 1-ethyl-2-vinylpyridinium bromide, chloride or methyl sulfate, 4-vinylpyridinium bromide, chloride or methyl sulfate, and mixtures thereof.

d. Zwitterionic Monomeric Units

Non-limiting examples of zwitterionic monomeric units suitable for the present invention include zwitterionic monomeric units derived from zwitterionic monomers selected from the group consisting of: sulfobetaine monomers, such as sulfopropyl dimethylammonium ethyl methacrylate (SPE from Raschig), sulfopropyldimethylammonium propylmethacrylamide (SPP from Raschig), and sulfopropyl-2-vinylpyridinium (SPV from Raschig), 3-((3-methacrylamidopropyl)dimethylammonio)propane-1-sulfonate (SZ), phosphobetaine monomers, such as phosphatoethyl trimethylammonium ethyl methacrylate, carboxybetaine monomers, N-(carboxymethyl)-3-methacrylamido-N,N-dimethlpropan-1-aminium chloride (CZ). In one example, the zwitterionic monomeric unit is derived from CZ, SZ, and mixtures thereof.

In one example, a soil adsorbing polymer of the soil adsorbing composite of the present invention may comprise at least one monomeric unit selected from groups a (non-ionic monomeric units) and b (anionic monomeric units) and at least one monomeric unit selected from groups c (cationic monomeric units) and d (zwitterionic monomeric units).

In one example, the soil adsorbing polymer of the soil adsorbing composite comprises 100% wt of a monomeric unit from group a, b, c, or d. In another example, the soil adsorbing polymer of the soil adsorbing composite comprises 100% wt of a monomeric unit from group a, for example acrylamide, in other words, the soil adsorbing polymer may be a polyacrylamide.

In one example, the soil adsorbing polymer of the soil adsorbing composite comprises at least 69.9% wt and/or at least 70% wt and/or at least 75% wt and/or at least 80% wt and/or at least 85% wt and/or at least 90% wt and/or at least 95% wt and/or at least 98% wt and/or at least 99% wt and/or at least 99.5% wt of a monomeric unit from group a. The balance of the soil adsorbing polymer of the soil adsorbing composite (no more than 30.1% wt and/or no more than 30% wt and/or no more than 25% wt and/or no more than 20% wt and/or no more than 15% wt and/or no more than 10% wt and/or no more than 5% wt and/or no more than 2% wt and/or no more than 1% wt and/or no more than 0.5% wt total) comprises one or more monomeric units selected from groups b, c, and d. In one example, the soil adsorbing polymer of the soil adsorbing composite comprises from about 70% to about 99.5% wt of a monomeric unit from group a, from about 0.1% to about 10% wt of a monomeric unit from group b, and from about 0.3% to about 29% wt of a monomeric unit from group c. In still another example, the soil adsorbing polymer of the soil adsorbing composite comprises from about 70% to about 99.5% wt of a monomeric unit from group a, from about 0.5% to about 30% wt combined of monomeric units from groups b and c. In another example, the soil adsorbing polymer of the soil adsorbing composite comprises 100% by weight of a monomeric unit from group a, for example is a polyacrylamide.

In one example, the soil adsorbing polymer of the soil adsorbing composite comprises from about 70% to about 99.5% wt of a monomeric unit from group a, from about 0.1% to about 10% wt of a monomeric unit from group b, and from about 0.3% to about 29% wt of a monomeric unit from group d. In still another example, the soil adsorbing polymer of the soil adsorbing composite comprises from about 70% to about 99.5% wt of a monomeric unit from group a, from about 0.5% to about 30% wt combined of monomeric units from groups b and d.

In one example, the soil adsorbing polymer of the soil adsorbing composite comprises from about 70% to about 99.5% wt of a monomeric unit from group a, and the balance to 100% comprising from about 0.2% to about 29% wt of a monomeric unit from group c, and from about 0.3% to about 29% wt of a monomeric unit from group d. In still another example, the soil adsorbing polymer of the soil adsorbing composite comprises from about 70% to about 99.5% wt of a monomeric unit from group a, from about 0.5% to about 30% wt combined of monomeric units from groups c and d.

In one example, the soil adsorbing polymer of the soil adsorbing composite comprises at least 0.1% wt and/or at least 1% and/or at least 5% wt and/or at least 7% wt and/or at least 10% wt and/or to about 25% wt and/or to about 20% wt and/or to about 15% wt of a monomeric unit from group b.

In one example, the soil adsorbing polymer of the soil adsorbing composite comprises at least 0.1% wt and/or at least 0.3% wt and/or at least 1% and/or at least 5% wt and/or at least 7% wt and/or at least 10% wt and/or to about 75% wt and/or to about 70% wt and/or to about 65% wt and/or to about 55% wt and/or to about 40% wt and/or to about 30% wt and/or to about 25% wt and/or to about 20% wt and/or to about 15% wt of a monomeric unit from group c.

In one example, the soil adsorbing polymer of the soil adsorbing composite comprises at least 0.1% wt and/or at least 0.3% wt and/or at least 0.5% and/or at least 1% and/or at least 5% wt and/or at least 7% wt and/or at least 10% wt and/or to about 75% wt and/or to about 70% wt and/or to about 65% wt and/or to about 55% wt and/or to about 40% wt and/or to about 30% wt and/or to about 25% wt and/or to about 20% wt and/or to about 15% wt of a monomeric unit from group d.

In another example, the soil adsorbing polymer of the soil adsorbing composite comprises no more than 30.1% wt of a monomeric unit selected from the group consisting of: group b, group c, group d, and mixtures thereof.

In one example, the soil adsorbing polymer of the soil adsorbing composite may comprise a monomeric unit from group a and a monomeric unit from group b.

In one example, the soil adsorbing polymer of the soil adsorbing composite may comprise a monomeric unit from group a and a monomeric unit from group c.

In another example, the soil adsorbing polymer of the soil adsorbing composite of the present invention may comprise a monomeric unit from group a and a monomeric unit from group d.

In still another example, the soil adsorbing polymer of the soil adsorbing composite of the present invention may comprise a monomeric unit from group b and a monomeric unit from group c.

In still another example, the soil adsorbing polymer of the soil adsorbing composite of the present invention may comprise a monomeric unit from group b and a monomeric unit from group d.

In still another example, the soil adsorbing polymer of the soil adsorbing composite of the present invention may comprise a monomeric unit from group c and a monomeric unit from group d.

In yet another example, the soil adsorbing polymer of the soil adsorbing composite of the present invention may comprise a monomeric unit from group a, a monomeric unit from group b, and a monomeric unit from group c.

In even another example, the soil adsorbing polymer of the soil adsorbing composite of the present invention may comprise a monomeric unit from group a, a monomeric unit from group b, and a monomeric unit from group d.

In yet another example, the soil adsorbing polymer of the soil adsorbing composite of the present invention may comprise a monomeric unit from group a, a monomeric unit from group c, and a monomeric unit from group d.

In another example, the soil adsorbing polymer of the soil adsorbing composite of the present invention may comprise a monomeric unit from group b, a monomeric unit from group c, and a monomeric unit from group d.

In even yet another example, the soil adsorbing polymer of the soil adsorbing composite of the present invention may comprise a monomeric unit from group a, a monomeric unit from group b, a monomeric unit from group c and a monomeric unit from group d.

In one example, when present in the soil adsorbing polymer of the soil adsorbing composite, the monomeric unit from group b and the monomeric unit from group c are present in the soil adsorbing composite at a molar ratio of from about 3:1 to 1:3 and/or from about 2:1 to 1:2 and/or from about 1.3:1 to 1:1.3 and/or about 1:1 or less or about 1:1 or more.

In another example, when present in the soil adsorbing polymer of the soil adsorbing composite, the monomeric unit from group b and the monomeric unit from group d are present in the soil adsorbing composite at a molar ratio of from about 3:1 to 1:3 and/or from about 2:1 to 1:2 and/or from about 1.3:1 to 1:1.3 and/or about 1:1 or less or about 1:1 or more.

In another example, when present in the soil adsorbing polymer of the soil adsorbing composite, the monomeric unit from group c and the monomeric unit from group d are present in the soil adsorbing composite at a molar ratio of from about 3:1 to 1:3 and/or from about 2:1 to 1:2 and/or from about 1.3:1 to 1:1.3 and/or about 1:1 or less or about 1:1 or more.

In still another example, the soil adsorbing polymer of the soil adsorbing composite comprises a monomeric unit from group a and a monomeric unit from group c. For example, the soil adsorbing composite may comprise an acrylamide monomeric unit and a quaternary ammonium monomeric unit. The quaternary monomeric unit may be selected from the group consisting of: monoquaternary ammonium monomeric units, diquaternary ammonium monomeric units, and triquaternary ammonium monomeric units. In one example, the soil adsorbing polymer of the soil adsorbing composite may comprise at least 69.9% wt of the monomeric unit from group a and no more than 30.1% wt of the monomeric unit from group c.

In still another example, the soil adsorbing polymer of the soil adsorbing composite comprises a monomeric unit from group a and a monomeric unit from group b. For example, the soil adsorbing polymer of the soil adsorbing composite may comprise an acrylamide monomeric unit and an acrylic acid monomeric unit. In one example, the soil adsorbing polymer of the soil adsorbing composite may comprise at least 69.9% wt of the monomeric unit from group a and no more than 30.1% wt of the monomeric unit from group b.

In yet another example, the soil adsorbing polymer of the soil adsorbing composite comprises a monomeric unit from group b and a monomeric unit from group c. For example, the soil adsorbing polymer of the soil adsorbing composite may comprise an anionic monomeric unit derived from an anionic monomer selected from the group consisting of: acrylic acid, methacrylic acid, 2-acrylamido-2-methylpropane sulfonic acid, carboxyethyl acrylate, and mixtures thereof and a quaternary ammonium monomeric unit. The quaternary ammonium monomeric unit may be derived from a quaternary monomer selected from the group consisting of: monoquaternary ammonium monomeric units, diquaternary ammonium monomeric units, triquaternary ammonium monomeric units, and mixtures thereof. In one example, the soil adsorbing composite comprises an anionic monomeric unit derived from acrylic acid and a quaternary ammonium monomeric unit derived from MAPTAC. In one example, the soil adsorbing composite may comprise no more than 25% wt of the monomeric unit from group b and no more than 75% wt of the monomeric unit from group c.

In even yet another example, the soil adsorbing polymer of the soil adsorbing composite comprises a monomeric unit from group a and a monomeric unit from group b and a monomer unit from group c. For example, the soil adsorbing polymer of the soil adsorbing composite may comprise an acrylamide monomeric unit, and an anionic monomeric unit derived from an anionic monomer selected from the group consisting of: acrylic acid, methacrylic acid, 2-acrylamido-2-methylpropane sulfonic acid, carboxyethyl acrylate, and mixtures thereof and a quaternary ammonium monomeric unit. The quaternary ammonium monomeric unit may be derived from a quaternary monomer selected from the group consisting of: monoquaternary ammonium monomeric units, diquaternary ammonium monomeric units, triquaternary ammonium monomeric units, and mixtures thereof. In one example, the soil adsorbing polymer of the soil adsorbing composite comprises a nonionic monomeric unit derived from acrylamide, an anionic monomeric unit derived from acrylic acid, and a cationic monomeric unit derived from MAPTAC. In another example, the soil adsorbing polymer of the soil adsorbing composite comprises a nonionic monomeric unit derived from acrylamide, an anionic monomeric unit derived from acrylic acid, and a cationic monomeric unit derived from DADMAC. In still another example, the soil adsorbing polymer of the soil adsorbing composite comprises a nonionic monomeric unit derived from acrylamide, an anionic monomeric unit derived from acrylic acid, and a cationic monomeric unit derived from TQ. In another example, the soil adsorbing polymer of soil adsorbing composite comprises a nonionic monomeric unit derived from acrylamide, an anionic monomeric unit derived from CEA, and a cationic monomeric unit derived from MAPTAC. In still another example, the soil adsorbing polymer of soil adsorbing composite comprises a nonionic monomeric unit derived from acrylamide, an anionic monomeric unit derived from AMPS, and a cationic monomeric unit derived from MAPTAC. In one example, the soil adsorbing polymer of soil adsorbing composite may comprise at least 69.9% wt of the monomeric unit from group a and no more than 30.1% wt combined of the monomeric units from groups b and c. In another example, the soil adsorbing polymer of soil adsorbing composite may comprise from about 70% to about 99.5% wt of the monomeric unit from group a, from 0.1% to about 30% wt of the monomeric unit from group b, and from about 0.1% to about 30% wt of the monomeric unit from group c. In still another example, the soil adsorbing polymer of soil adsorbing composite may comprise from about 70% to about 99.5% wt of the monomeric unit from group a and from about 0.5% to 30% wt combined of the monomeric units from groups b and c.

In even still yet another example, the soil adsorbing polymer of soil adsorbing composite comprises a monomeric unit from group a and a monomeric unit from group c and a monomer unit from group d. For example, the soil adsorbing polymer of soil adsorbing composite may comprise an acrylamide monomeric unit, a quaternary ammonium monomeric unit, and a zwitterionic monomeric unit selected from the group consisting of: CZ, SZ, and mixtures thereof. The quaternary ammonium monomeric unit may be derived from a quaternary monomer selected from the group consisting of: monoquaternary ammonium monomeric units, diquaternary ammonium monomeric units, triquaternary ammonium monomeric units, and mixtures thereof. In one example, the soil adsorbing composite comprises a nonionic monomeric unit derived from acrylamide, a cationic monomeric unit derived from MAPTAC, and a zwitterionic monomeric unit derived from CZ. In another example, the soil adsorbing composite comprises a nonionic monomeric unit derived from acrylamide, a cationic monomeric unit derived from MAPTAC, and a zwitterionic monomeric unit derived from SZ. In one example, the soil adsorbing polymer of the soil adsorbing composite may comprise at least 69.9% wt of the monomeric unit from group a and no more than 30.1% wt combined of the monomeric units from groups c and d. In another example, the soil adsorbing polymer of the soil adsorbing composite may comprise from about 70% to about 99.5% wt of the monomeric unit from group a, from 0.1% to about 30% wt of the monomeric unit from group c, and from about 0.1% to about 30% wt of the monomeric unit from group d. In still another example, the soil adsorbing polymer of the soil adsorbing composite may comprise from about 70% to about 99.5% wt of the monomeric unit from group a and from about 0.5% to 30% wt combined of the monomeric units from groups c and d.

In even yet another example, the soil adsorbing polymer of the soil adsorbing composite comprises a monomeric unit from group a and a monomeric unit from group b and a monomer unit from group d. For example, the soil adsorbing polymer of the soil adsorbing composite may comprise an acrylamide monomeric unit, and an anionic monomeric unit derived from an anionic monomer selected from the group consisting of: acrylic acid, methacrylic acid, 2-acrylamido-2-methylpropane sulfonic acid, carboxyethyl acrylate, and mixtures thereof and a zwitterionic monomeric unit selected from the group consisting of: CZ, SZ, and mixtures thereof. In one example, the soil adsorbing polymer of the soil adsorbing composite comprises a nonionic monomeric unit derived from acrylamide, an anionic monomeric unit derived from acrylic acid, and zwitterionic monomeric unit derived from CZ. In another example, the soil adsorbing polymer of the soil adsorbing composite comprises a nonionic monomeric unit derived from acrylamide, an anionic monomeric unit derived from acrylic acid, and a zwitterionic monomeric unit derived from SZ. In one example, the soil adsorbing polymer of the soil adsorbing composite may comprise at least 69.9% wt of the monomeric unit from group a and no more than 30.1% wt combined of the monomeric units from groups b and d. In another example, the soil adsorbing polymer of the soil adsorbing composite may comprise from about 70% to about 99.5% wt of the monomeric unit from group a, from 0.1% to about 30% wt of the monomeric unit from group b, and from about 0.1% to about 30% wt of the monomeric unit from group d. In still another example, the soil adsorbing polymer of the soil adsorbing composite may comprise from about 70% to about 99.5% wt of the monomeric unit from group a and from about 0.5% to 30% wt combined of the monomeric units from groups b and d.

In even yet another example, the soil adsorbing polymer of the soil adsorbing composite comprises a monomeric unit from group a and a monomeric unit from group d. For example, the soil adsorbing polymer of the soil adsorbing composite may comprise an acrylamide monomeric unit, and a zwitterionic monomeric unit selected from the group consisting of: CZ, SZ, and mixtures thereof. In one example, the soil adsorbing polymer of the soil adsorbing composite comprises a nonionic monomeric unit derived from acrylamide and zwitterionic monomeric unit derived from CZ. In another example, the soil adsorbing polymer of the soil adsorbing composite comprises a nonionic monomeric unit derived from acrylamide and a zwitterionic monomeric unit derived from SZ. In one example, the soil adsorbing polymer of the soil adsorbing composite may comprise at least 69.9% wt of the monomeric unit from group a and no more than 30.1% wt of the monomeric unit from group d. In another example, the soil adsorbing polymer of the soil adsorbing composite may comprise from about 70% to about 99.5% wt of the monomeric unit from group a, from 0.5% to about 30% wt of the monomeric unit from group d.

In one example, the soil adsorbing polymer of the soil adsorbing composite of the present invention comprises a nonionic hydrophilic monomeric unit. Non-limiting examples of suitable hydrophilic monomeric units are derived from nonionic hydrophilic monomers selected from the group consisting of: hydroxyalkyl esters of α,β-ethylenically unsaturated acids, α,β-ethylenically unsaturated amides, α,β-ethylenically unsaturated monoalkyl amides, α,β-ethylenically unsaturated dialkyl amides, α,β-ethylenically unsaturated monomers bearing a water-soluble polyoxyalkylene segment of the poly(ethylene oxide) type, α,β-ethylenically unsaturated monomers which are precursors of hydrophilic units or segments, vinylpyrrolidones, α,β-ethylenically unsaturated monomers of the ureido type, and mixtures thereof. In one example, the nonionic hydrophilic monomeric unit is derived from acrylamide.

In another example, the soil adsorbing polymer of the soil adsorbing composite of the present invention comprises a nonionic hydrophobic monomeric unit. Non-limiting examples of suitable nonionic hydrophobic monomeric units are derived from nonionic hydrophobic monomers selected from the group consisting of: vinylaromatic monomers, vinyl halides, vinylidene halides, $C_1$-$C_{12}$ alkylesters of α,β-monoethylenically unsaturated acids, vinyl esters of saturated carboxylic acids, allyl esters of saturated carboxylic acids, α,β-monoethylenically unsaturated nitriles containing from 3 to 12 carbon atoms, α-olefins, conjugated dienes, and mixtures thereof.

In one example, the soil adsorbing polymer of the soil adsorbing composite comprises an anionic monomeric unit. Non-limiting examples of suitable anionic monomeric units are derived from anionic monomers selected from the group consisting of: monomers having at least one carboxylic function, for instance α,β-ethylenically unsaturated carboxylic acids or the corresponding anhydrides, monomers that are precursors of carboxylate functions, monomers having at least one sulfate or sulfonate function, monomers having at least one phosphonate or phosphate function, esters of ethylenically unsaturated phosphates, and mixtures thereof. In one example, the anionic monomeric unit is derived from an anionic monomer selected from the group consisting of: acrylic acid, methacrylic acid, 2-acrylamido-2-methylpropane sulfonic acid, carboxyethyl acrylate, and mixtures thereof.

In one example, the soil adsorbing polymer of the soil adsorbing composite comprises a cationic monomeric unit. Non-limiting examples of suitable cationic monomeric units are derived from cationic monomers selected from the group consisting of: acryloyl- or acryloyloxyammonium monomers, 1-ethyl-2-vinylpyridinium or 1-ethyl-4-vinylpyridinium bromide, chloride or methyl sulfate, N,N-dialkyl-diallylamine monomers, polyquaternary monomers, N,N-(dialkylamino-ω-alkyl)amides of α,β-monoethylenically unsaturated carboxylic acids, α,β-monoethylenically unsaturated amino esters, vinylpyridines, vinylamine, vinylimidazolines, monomers that are precursors of amine functions which give rise to primary amine functions by simple acid or base hydrolysis, and mixtures thereof. In one example, the cationic monomeric unit is derived from MAPTAC. In another example, the cationic monomeric unit is derived from DADMAC. In still another example, the cationic monomeric unit is derived from 2-hydroxy-$N^1$-(3-(2((3-methacrylamidopropyl)dimethylamino)-acetamido) propyl)-$N^1$, $N^1$, $N^3$, $N^3$, $N^3$-pentamethylpropane-1,3-diaminium chloride.

Particulate Materials

Non-limiting examples of particulate materials, when present, suitable for use in the soil adsorbing composites of the present invention include silica, titanium dioxide, pulp, quartz, clay, metal oxides, and others described in U.S. Published Patent Application No. 2014/0090850. The particles may comprise for example natural or synthetic clays (including those made from amorphous or structured clays), inorganic metal oxides (e.g., silica, alumina, and the like), latexes, etc. Particularly suitable particulate materials include inorganic materials such as silica, alumina, titania (TiO2), indium tin oxide (ITO), CdSe, magnesium oxide, aluminum oxide, silicon dioxide, aluminosilicate, zinc oxide, titanium dioxide, chromium oxide, copper oxide, manganese oxide, cerium oxide, tin oxide, iron oxide, nickel oxide, lead oxide, molybdenum oxide, vanadium oxide, thorium oxide, zirconium oxide, and hafnium oxide, and mixtures thereof. Organic particulate materials suitable for use include polymeric particles, carbon, graphite, graphene, pulp, such as pulp fibers, for example wood pulp fibers, etc., or mixtures thereof. In one example, the particulate material is silica. In another example, the particulate material is titanium dioxide. In still another example, the particulate material is pulp, for example pulp fibers, such as wood pulp fibers.

In one example, the particulate material exhibits a particle diameter of from about 1 μm to about 20 μm and/or from about 2 μm to about 10 μm and/or from about 3 μm to about 7 μm and/or about 5 μm as measured according to the Particle Diameter Test Method described herein.

In another example, the particulate material settles to the bottom of a liquid in less than 60 seconds.

In another example, the particulate material floats to the top of a liquid containing the particulate material and/or soil adsorbing composites comprising the particulate material.

In still another example, the particulate material exhibits a density of greater than 1 g/cm$^3$.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell, trichomes, and bagasse can be used in this invention. Other sources of cellulose in the form of fibers or capable of being spun into fibers include grasses and grain sources.

In one example, the fibrous structure of the present invention may comprise filaments, such as polypropylene filaments, and fibers, such as pulp fibers, such as a co-formed fibrous structure. The pulp fibers may be the article-forming components that comprise a soil adsorbing composite of the present invention.

Processes for Making a Soil Adsorbing Composite

The soil adsorbing composites of the present invention where a soil adsorbing polymer is associated, with a particulate material or itself may be made by a variety of different processes for example polymerizing in situ with optional crosslinking, grafting to, from, and/or through with respect to pulp, sol-gel reactions, polymerization ex situ with crosslinking. In one example, when the soil adsorbing polymer is polymerized in situ in the presence of the particulate material a higher % solids may be useful to create crosslinks to the particulate material.

The soil adsorbing polymers of the soil adsorbing composites of the present invention may be made by any suitable process known in the art. For example, the soil adsorbing polymers may be made by a wide variety of techniques, including bulk, solution, emulsion, or suspension polymerization. Polymerization methods and techniques for polymerization are described generally in Encyclopedia of Polymer Science and Technology, Interscience Publishers (New York), Vol. 7, pp. 361-431 (1967), and Kirk-Othmer Encyclopedia of Chemical Technology, 3rd edition, Vol 18, pp. 740-744, John Wiley & Sons (New York), 1982, both incorporated by reference herein. See also Sorenson, W. P. and Campbell, T. W., Preparative Methods of Polymer Chemistry. 2nd edition, Interscience Publishers (New York), 1968, pp. 248-251, incorporated by reference herein, for general reaction techniques suitable for the present invention. In one example, the soil adsorbing polymers are made by free radical copolymerization, using water soluble initiators. Suitable free radical initiators include, but are not limited to, thermal initiators, redox couples, and photochemical initiators. Redox and photochemical initiators may be used for polymerization processes initiated at temperatures below about 30° C. Such initiators are described generally in Kirk-Othmer Encyclopedia of Chemical Technology, 3rd edition, John Wiley & Sons (New York), Vol. 13, pp. 355-373 (1981), incorporated by reference herein. Typical water soluble initiators that can provide radicals at 30° C. or below include redox couples, such as potassium persulfate/silver nitrate, and ascorbic acid/hydrogen peroxide. In one example, the process utilizes thermal initiators in polymerization processes conducted above 40° C. Water soluble initiators that can provide radicals at 40° C. or higher can be used. These include, but are not limited to, hydrogen peroxide, ammonium persulfate, and 2,2'-azobis(2-amidinopropane) dihydrochloride. In one example, water soluble starting monomers are polymerized in an aqueous alcohol solvent at 60° C. using 2,2'-azobis(2-amidinopropane) dihydrochloride as the initiator. The aqueous alcohol solvent should typically contain at least about 10% by volume, of alcohol in order to prevent the polymerization reaction medium from gelling. Suitable alcohols for use in such reactions include low molecular weight alcohols such as, but not limited to, methanol, ethanol, isopropanol, and butanol.

Another technique for making the soil adsorbing polymers is a solution polymerization as described in U.S. Pat. No. 3,317,370, Kekish, issued May 2, 1967 and U.S. Pat. No. 3,410,828, Kekish, issued Nov. 12, 1968, both incorporated herein by reference. According to such process, the acrolein, or other aldehydic monomer, is copolymerized with a non-nucleophilic, water soluble, nitrogen-heterocyclic polymerizable monomer and a redox initiator system. The copolymer is then made cationic by reacting the copolymer with a water soluble amine or amine quaternary. Amines, including amine quaternaries, that are useful include, but are not limited to, primary, secondary, and tertiary amines such as ethylene diamine, diethylene triamine, triethylene tetramine, tetraethylene pentamine, or partial or fully quaternized derivatives of any of the foregoing, hydrazides and quaternaries thereof such as betaine hydrazide chloride, N—N-dimethylglycine hydrazide, unsymmetrical dimethyl hydrazides, polymers, such as those formed by reaction of urea and polyalkylene polyamines, guanidines, biguanides, guanylureas, mono and polyhydroxy polyamines and quaternaries thereof, etc.

In one example, a soil adsorbing composite of the present invention may be made by the following process comprising the step of polymerizing one or more monomers capable of forming one or more soil adsorbing polymers of the present invention in the presence of one or more particulate materials such that one or more soil adsorbing polymers formed from the monomers associates with the one or more particulate materials to form a soil adsorbing composite. The process may further comprise the step of mixing one or more of the particulate materials with one or more monomers capable of forming one or more soil adsorbing polymers prior to performing the polymerizing step.

In another example, a soil adsorbing composite of the present invention may be made by the following process comprising the steps of: providing one or more functionalized particulate materials, for example an amino-functionalized particulate material, such as an amino-functionalized silica particle; and then polymerizing one or monomers capable of forming one or more soil adsorbing polymers in the presence of the functionalized particulate material such that one or more soil adsorbing polymers formed from the monomers associates with the one or more particulate materials to form a soil adsorbing composite of the present invention. In one example, the method further comprises the step of: functionalizing one or more particulate materials, such as with an amine functionality, to form a functionalized particulate material, for example an amino-functionalized silica particle, which can be used to graft monomers capable of forming a soil adsorbing polymer or a soil adsorbing polymer through, to, or from the functionalized particulate material.

In even another example of the present invention, a process for making a soil adsorbing composite of the present invention comprises the steps of:

a. providing one or more particulate materials;

b. contacting at least one of the particulate materials with a reactive monomer to prepare at least one reactive particulate material comprising a monomer modified site (this step of contacting the particulate materials may optionally comprise the step of subjecting the particulate materials to a temperature of at least 30° C.); and c. copolymerizing one or more additional monomers capable of forming a soil adsorbing polymer with the monomer modified site on the reactive particulate material to form a soil adsorbing composite comprising a soil adsorbing polymer derived from the reactive monomer and the additional monomers that is associated (this step of copolymerizing may optionally comprise conducting the copolymerizing step at a temperature of at least 30° C.); and d. optionally, washing the soil adsorbing composite to remove at least a portion and/or substantially all and/or all of any reactive monomer, additional monomers capable of forming a soil adsorbing polymer and/or soil adsorbing polymer that is not associated to the soil adsorbing composite.

In even yet another example of the present invention, a process for making a soil adsorbing composite of the present invention, wherein the process comprises the steps of:

a. copolymerizing one or more monomers capable of forming a soil adsorbing polymer with one or more reactive monomers to form a reactive soil adsorbing polymer (this step of copolymerizing may optionally comprise conducting the copolymerizing step at a temperature of at least about 30° C.);

b. providing one or more particulate materials; and c. contacting at least one of the particulate materials with the reactive soil adsorbing polymer to form a soil adsorbing composite comprising a soil adsorbing polymer that is associated (this step of contacting the particulate material may optionally comprise the step of subjecting the particulate material to a temperature of at least 30° C.); and d. optionally, washing the soil adsorbing composite to remove at least a portion and/or substantially all and/or all of any reactive monomer, additional monomers capable of forming a soil adsorbing polymer and/or soil adsorbing polymer that is not associated to the soil adsorbing composite.

In even still yet another example of the present invention, a process for making a soil adsorbing composite of the present invention, wherein the process comprises the steps of:

a. providing one or more particulate materials;

b. contacting at least one of the particulate materials with a free radical generating source to prepare a reactive particulate material comprising a reactive site (this step of contacting the particulate material may optionally comprise the step of subjecting the particulate material to a temperature of at least 30° C.);

c. contacting the reactive particulate material with one or more monomers capable of forming a soil adsorbing polymer (this step of contacting the article may optionally comprise the step of subjecting the particulate material to a temperature of at least 30° C.); and d. copolymerizing the monomers with the reactive site on the reactive particulate material to form a soil adsorbing composite comprising a soil adsorbing polymer that is associated (this step of copolymerizing may optionally comprise conducting the copolymerizing step at a temperature of at least about 30° C.); and e. optionally, washing the soil adsorbing composite to remove at least a portion and/or substantially all and/or all of any reactive monomer, additional monomers capable of forming a soil adsorbing polymer and/or soil adsorbing polymer that is not associated to the soil adsorbing composite.

In even still yet another example of the present invention, a process for making a soil adsorbing composite of the present invention, wherein the process comprises the steps of:

a. providing one or more particulate materials;

b. providing at least one free radical generating source;

c. providing one or more monomers capable of forming a soil adsorbing polymer;

d. optionally providing one or more monomers capable of crosslinking;

e. copolymerizing the one or monomer monomers with the reactive particulate material and the free radical generating source to form a soil adsorbing composite comprising a soil adsorbing polymer that is associated (this step of copolymerizing may optionally comprise conducting the copolymerizing step at a temperature of at least about 30° C.); and f. optionally, washing the soil adsorbing composite to remove at least a portion and/or substantially all and/or all of any reactive monomer, additional monomers capable of forming a soil adsorbing polymer and/or soil adsorbing polymer that is not associated to the soil adsorbing composite.

In even yet another example of the present invention, a process for making a soil adsorbing composite of the present invention, wherein the process comprises the step of polymerizing in the presence of soil adsorbing polymers of the present invention one or more monomers capable of forming one or more particulate materials such that a particulate material, such as silica, is formed and is associated with one or more of the soil adsorbing polymers forming a soil adsorbing composite. The process may further comprise the step of polymerizing in the presence of one or more soil adsorbing polymers one or more monomers capable of forming one or more particulate materials such that a particulate material, such as silica, titania, alumina is formed and is associated with one or more of the soil adsorbing polymers forming a soil adsorbing composite.

In even still yet another example, a process for making a soil adsorbing composite according to the present invention comprises the steps of:

i. providing two or more monomeric units selected from the group consisting of:
 a. nonionic monomeric units;
 b. anionic monomeric units;
 c. cationic monomeric units;
 d. zwitterionic monomeric units; and
 e. mixtures thereof; and ii. polymerizing the two or more monomeric units such that a soil adsorbing composite according to the present invention is formed.

In another example, any process of making a soil adsorbing composite of the present invention may further comprise the step of removing any free water from the soil adsorbing composite. In yet another example, the method may further comprise the step of breaking the soil adsorbing composite into smaller pieces. In even another example, the method may further comprise the step of grinding the soil adsorbing composite to particles that exhibit a particle diameter per sieving of, in one example less than 10 µm, in another example greater than 500 µm, and in still another example from about 75 µm to about 500 µm and/or from about 125 µm to about 300 µm.

Non-Limiting Example of Synthesis of Particulate Material-Containing Soil Adsorbing Composites a. Preparation of Particulate Material (Silica)-Containing Soil Adsorbing Composite Example 1A 200 g Homopolymer Silica-Containing Soil Adsorbing Composite To a 6 L Erlenmeyer flask is added 115 grams of acrylamide (available from Sigma-Aldrich Chemical, Milwaukee, Wis., USA) ("monomers capable of forming a soil adsorbing polymer") and 115 grams of Sipernat 22LS ($SiO_2$) (available from Evonik Industries, Parsippany, N.J.) ("particulate material") with 4.2 L of deionized water to form a reactant solution. The reactant solution is stirred for 10 minutes by a mechanical stirrer at 400 rpm while degassing with inert gas to remove dissolved $O_2$. The reactant solution is warmed on a hot plate while stirring at 300 rpm until an internal temperature of 60° C. is achieved. Once the desired temperature of 60° C. has been achieved, the temperature of the reactant solution is held steady at 60° C.-65° C. A catalytic amount (about 100 mg) of initiator (2.2'-azobis(2-methylpropionamidine) dihydrochloride) (available from Sigma-Aldrich Chemical, Milwaukee, Wis., USA) is then added to the reactant solution to initiate the polymerization of the acrylamide. The reactant solution becomes a turbid mixture as it is stirred for 18 hours. At the end of this time the reactant solution has thickened to indicate polymerization of the acrylamide has resulted thus forming a solution of a silica-based soil adsorbing composite. The solution is then dried in a drum dryer (Drum Dryer and Flaker Corporation, Model #215 of North Liberty, Ind. or equivalent), which consists of two steam heated counter-rotating stainless steel cylinders, at a speed of 5 rpm. The solution is added to the drum dryer at a cylinder nip from above to keep a constant pool (about 0.5 L) to form a dried, flaked silica-based soil adsorbing composite.

The dried silica-based soil adsorbing composite is then placed on a medium porosity fritted filtering funnel and washed two times (500 mL each wash) with 5% wt/vol (g/mL) chilled aqueous sodium bicarbonate solution. After completion of the washes, the washed silica-based soil adsorbing composite is then dried again in the drum dryer as described above to produce about 190 g of a dried silica-based soil adsorbing composite according to the present invention. The dried silica-based soil adsorbing composite is then ground in a particle grinder (IKA 100) for 5 minutes. The soil adsorbing composites may be sieved with a sieve (Retsch sieve shaker AS-200 or equivalent) to desired sizes as specified in Table 2.

Example 1B 200 g Homopolymer Silica-Containing Soil Adsorbing Composite

To a 6 L Erlenmeyer flask is added 115 grams of acrylamide (available from Sigma-Aldrich Chemical, Milwaukee, Wis., USA) ("monomers capable of forming a soil adsorbing polymer") and 115 grams of Sipernat 22LS ($SiO_2$) (available from Evonik Industries, Parsippany, N.J.) ("particulate material") with 4.2 L of deionized water to form a reactant solution. The reactant solution is stirred for 10 minutes by a mechanical stirrer at 400 rpm while degassing with inert gas to remove dissolved $O_2$. The reactant solution is warmed on a hot plate while stirring at 300 rpm until an internal temperature of 60° C. is achieved. Once the desired temperature of 60° C. has been achieved, the temperature of the reactant solution is held steady at 60° C.-65° C. A catalytic amount (about 100 mg) of initiator (2.2'-azobis(2-methylpropionamidine) dihydrochloride) (available from Sigma-Aldrich Chemical, Milwaukee, Wis., USA) is then added to the reactant solution to initiate the polymerization of the acrylamide. The reactant solution becomes a turbid mixture as it is stirred for 18 hours. At the end of this time the reactant solution has thickened to indicate polymerization of the acrylamide has resulted thus forming a solution of a silica-containing soil adsorbing composite. The solution is then poured into 12×9×3 (×2) Pyrex pans and set in an oven that is preheated to 67° C. and allowed to stand in the oven to remove excess free water at the set temperature (67° C.) for 7 days to form a dried soil adsorbing composite. The dried soil adsorbing composite may be broken up into smaller chunks to expedite the drying process. The dried silica-based soil adsorbing composite is then placed on a medium porosity fritted filtering funnel and washed two times (500 mL each wash) with 5% wt/vol (g/mL) chilled aqueous sodium bicarbonate solution. After completion of the washes, the washed soil adsorbing composite is transferred to the same Pyrex pans mentioned above and is placed back into the oven at 67° C. for 48 hours to result in 194 g of a white solid (dried soil adsorbing composite). The soil adsorbing composite is then ground in a particle grinder (IKA 100) at 750-1000 rpm for 5 minutes. The soil adsorbing composites may be sieved with a sieve (Retsch sieve shaker AS-200 or equivalent) to desired sizes as specified in Table 2.

Example 2A

50 Gram of Terpolymer Silica-Containing Soil Adsorbing Composite

To a 2 L Erlenmeyer flask is added 23.8 grams of acrylamide (available from Sigma-Aldrich Chemical, Milwaukee, Wis., USA), 0.06 grams of acrylic acid (available from Sigma-Aldrich Chemical, Milwaukee, Wis., USA), 0.18 grams of [3-(methyacryloylamino) propyl]trimethylammonium chloride (MAPTAC)(available from Sigma-Aldrich Chemical, Milwaukee, Wis., USA) (all three "monomers capable of forming a soil adsorbing polymer") and 23.8 grams of Sipernat 22LS ($SiO_2$) (available from Evonik Industries, Parsippany, N.J.) ("particulate material") with 1.0 L of deionized water to form a reactant solution. The reactant solution is stirred for 10 minutes by mechanical stirrer at 400 rpm while degassing with inert gas to remove dissolved oxygen. The reactant solution is warmed on a hot plate while stirring at 300 rpm until an internal temperature of 60° C. is achieved. Once the desired temperature of 60° C. has been achieved, the reactant solution's temperature is held steady at 60° C.-65° C. A catalytic amount (about 100 mg) of initiator (2.2'-azobis(2-methylpropionamidine) dihydrochloride) (available from Sigma-Aldrich Chemical, Milwaukee, Wis., USA) is then added to the reactant solution to initiate the polymerization of the monomers. The reactant solution becomes a turbid mixture as it is stirred for 18 hours. At the end of this time the reactant solution has thickened to indicate polymerization of the monomers has resulted thus forming a solution of a silica-containing soil adsorbing composite. The solution (about 230 g/4 L of deionized water) is then dried in a drum dryer (Drum Dryer and Flaker Corporation, Model #215 of North Liberty, Ind. or equivalent), which consists of two steam heated counter-rotating stainless steel cylinders, at a speed of 5 rpm. The solution is added to the drum dryer at a cylinder nip from above to keep a constant pool (about 0.5 L) to form a dried, flaked silica-based soil adsorbing composite.

The dried silica-based soil adsorbing composite is then placed on a medium porosity fritted filtering funnel and washed two times (500 mL each wash) with 5% wt/vol (g/mL) chilled aqueous sodium bicarbonate solution. After completion of the washes, the washed silica-based soil adsorbing composite is then dried again in the drum dryer as described above to produce about 190 g of a dried silica-based soil adsorbing composite according to the present invention. The dried silica-based soil adsorbing composite is then ground in a particle grinder (IKA 100) for 5 minutes to achieve 125-300 μm particle diameter soil adsorbing composites as measured according to the Particle Diameter Test Method described herein.

Example 2B

50 Gram of Terpolymer Silica-Containing Soil Adsorbing Composite

To a 2 L Erlenmeyer flask is added 23.8 grams of acrylamide (available from Sigma-Aldrich Chemical, Milwaukee, Wis., USA), 0.06 grams of acrylic acid (available from Sigma-Aldrich Chemical, Milwaukee, Wis., USA), 0.18 grams of [3-(methyacryloylamino) propyl]trimethylammonium chloride (MAPTAC) (available from Sigma-Aldrich Chemical, Milwaukee, Wis., USA) (all three "monomers capable of forming a soil adsorbing polymer") and 23.8 grams of Sipernat 22LS ($SiO_2$) (available from Evonik Industries, Parsippany, N.J.) ("particulate material") with 1.0 L of deionized water to form a reactant solution. The reactant solution is stirred for 10 minutes by mechanical stirrer at 400 rpm while degassing with inert gas to remove dissolved oxygen. The reactant solution is warmed on a hot plate while stirring at 300 rpm until an internal temperature of 60° C. is achieved. Once the desired temperature of 60° C. has been achieved, the reactant solution's temperature is held steady at 60° C.-65° C. A catalytic amount (about 100 mg) of initiator (2.2'-azobis(2-methylpropionamidine) dihydrochloride) (available from Sigma-Aldrich Chemical, Milwaukee, Wis., USA) is then added to the reactant solution to initiate the polymerization of the monomers. The reactant solution becomes a turbid mixture as it is stirred for 18 hours. At the end of this time the reactant solution has thickened to indicate polymerization of the monomers has resulted thus forming a solution of a silica-containing soil adsorbing composite. The solution is then poured into 12×9×3 (×2) Pyrex pans and set in an oven that is preheated to 67° C. and allowed to stand in the oven to remove excess free water at the set temperature (67° C.) for 4 days to form a dried soil adsorbing composite. The dried soil adsorbing composite may be broken up into smaller chunks to expedite the drying process. The dried silica-based soil adsorbing composite is then placed on a medium porosity fritted filtering funnel and washed two times (500 mL each wash) with 5% wt/vol (g/mL) chilled aqueous sodium bicarbonate solution. After completion of the washes, the washed silica-based soil adsorbing composite is transferred to the same Pyrex pans mentioned above and is placed back into the oven at 67° C. for 48 hours to result in 52 g of a white solid (dried soil adsorbing composite). The soil adsorbing composite is then ground in a particle grinder (IKA 100) at 750-1000 rpm for 5 minutes to achieve particles of 125-300 μm according to sieving.

Example 2C

Homopolymer Silica-Containing Soil Adsorbing Composite

To a 2 L Erlenmeyer flask is added 23 g acrylamide (available from Sigma-Aldrich Chemical, Milwaukee, Wis., USA) and 23 g Sipernat 22LS (SiO2) (available from Evonik Industries, Parsippany, N.J.) ("particulate material") with 500 ml deionized water to form a reactant solution. The reactant solution is stirred for 10 minutes by mechanical stirrer at 400 rpm while degassing with inert gas to remove dissolved oxygen. The reactant solution is warmed on a hot plate while stirring at 300 rpm until an internal temperature of 60° C. is achieved. Once the desired temperature of 60° C. has been achieved, the reactant solution's temperature is held steady at 60-65° C. A catalytic amount (about 100 mg) of initiator (2.2'-azobis(2-methylpropionamidine) dihydrochloride) (available from Sigma-Aldrich Chemical, Milwaukee, Wis., USA) is then added to the reactant solution to initiate the polymerization of the monomers. The reactant solution becomes a turbid mixture as it is stirred for 18 hours. At the end of this time the reactant solution has thickened to indicate polymerization of the monomers has resulted thus forming a solution of a silica-containing soil adsorbing composite. The solution is then poured into 12×9×3 (×2) Pyrex pans and set in an oven that is preheated to 67° C. and allowed to stand in the oven to remove excess free water at the set temperature (67° C.) for 2 days to form a dried soil adsorbing composite. The dried soil adsorbing composite may be broken up into smaller chunks to expedite the drying process. The dried silica-based soil adsorbing composite is then placed on a medium porosity fritted filtering funnel and washed two times (500 mL each wash) with 5% wt/vol (g/mL) chilled aqueous sodium bicarbonate solution. After completion of the washes, the washed silica-based soil adsorbing composite is transferred to the same Pyrex pans mentioned above and is placed back into the oven at 67° C. for 48 hours. The soil adsorbing composite is then ground in a particle grinder (IKA 100) at 750-1000 rpm for 5 minutes. The soil adsorbing composites may be sieved with a sieve (Retsch sieve shaker AS-200 or equivalent) to desired sizes as specified in Table 2.

Non-Limiting Examples of Functionalized Particulate Material (Silica-Amine)-Containing Soil Adsorbing Composites Example 3

1. Preparation of Silica-Amine Solution

A silica-amine solution is prepared by dispersing 19.6 g of Aerosil 200 silica powder (available from Evonik) into 600 mL of toluene (available from Sigma-Aldrich, Milwaukee, Wis.). Then 12 mL (10.284 g, 63.88 mmol) of 3-amino propyldimethylethoxysilane (available from Sigma-Aldrich, Milwaukee, Wis.) is added to the mixture under ambient conditions and stirred continuously. The mixture is stirred while refluxing for sixteen hours. The solution is then cooled to room temp (22C), decanted into centrifuge tubes (available from VWR with Flat Caps, Polypropylene), and then centrifuged at 2000-3000 rpm for 5 min to isolate the functionalized silica particles (i.e., aminofunctionalized silica particles). The supernatant is discarded, and the functionalized silica particles are redispersed in 300 mL of fresh tetrahydrofuran ("THF") (ACS reagent, available from Sigma-Aldrich, Milwaukee, Wis.). This centrifugation-redispersion process is repeated twice more to ensure removal of any free starting material. The functionalized silica particles are then dispersed in a THF solution and stored in the freezer at −10° C. This functionalized silica particles/THF solution is herein referred to as a silica-amine solution used in the examples below.

In one or more of the examples below, the silica-amine solution may be dried to form silica-amine particles by adding an amount of the silica-amine solution to a centrifuge tube and centrifuging at 2180 rpm for 5 minutes. The supernatant is then decanted and the centrifuge tube is then placed in a vacuum oven at 25° C. for 16 hours until the THF solution has been removed. Next the remaining silica-amine particles are then dried under vacuum at 23° C. for 16 hours to result in the dried silica-amine particles. The dried silica-amine particles are then collected and used as described hereinbelow.

a. Polymerize In Situ Examples

All materials are supplied from Sigma-Aldrich, Milwaukee, Wis. unless otherwise noted.

3A—First 0.2 g of GMA (glycidylmethacrylate), 0.2 g of DMAPMA (dimethylaminopropyl methacrylamide), 19.6 g of NDMAAM (N-dimethyl acrylamide), 0.1 g of V-65B initiator (2'-azobis(2,4-dimethylpentanenitrile)) (WAKO Chemicals, VA) are dissolved in 140 mL EtAc (ethyl acetate) and placed into a separate container herein called the Monomer Solution A.

Next, 1 g of the silica-amine solution (in 45 mL THF) from above, is centrifuged at 2000-3000 rpm for 5 minutes and redispersed in 30 mL of ethyl acetate. This silica-amine solution in ethyl acetate is added together with the Monomer Solution A from above to a 500 mL round bottom flask with a stir bar to form a reactant mixture. The reactant mixture is capped, sparged for 5 minutes, and heated at 50° C. for 16 hours.

Then, the reactant mixture is precipitated in a beaker with 400 mL of 80/20 of hexanes/EtAc to form a soil adsorbing composite according to the present invention. The soil adsorbing composite is then dried under vacuum for 16 hours and stored in the freezer at −10° C. This results in a dried soil adsorbing composite of the present invention.

3B—In another example, first 0.648 g of methacryl anhydride, 0.2 g of DMAPMA (dimethylaminopropyl methacrylamide), 19.276 g of NDMAAM (N-dimethyl acrylamide), 0.1 g of V-65B initiator (2'-azobis(2,4-dimethylpentanenitrile)) (WAKO Chemicals, VA) are dissolved in 140 mL EtAc (ethyl acetate) and placed into a separate container herein called the Monomer Solution B.

Next, 1 g of the silica-amine solution (in 45 mLmL THF) from above is centrifuged at 2000-3000 rpm for 5 min and redispersed in 30 mL of ethyl acetate. The silica-amine in ethyl acetate is added together with the Monomer Solution B to a 500 mL round bottom flask with a stir bar to form a reactant mixture. The reactant mixture is capped, sparged for 5 minutes, and heated at 50° C. for 16 hours. Then, the reactant mixture is precipitated in a beaker with 400 mL of 80/20 of hexanes/EtAc to form a soil adsorbing composite according to the present invention. The soil adsorbing composite is then dried under vacuum for 16 hours and stored in the freezer at −10° C. This results in a dried soil adsorbing composite of the present invention.

b. Entangling Example

All materials are supplied from Sigma-Aldrich, Milwaukee, Wis. unless otherwise noted.

3C—First 0.1 g of GMA (glycidylmethacrylate), 19.7 g of NDMAAM (N-dimethyl acrylamide), 0.1 g of V-65B initiator (2'-azobis(2,4-dimethylpentanenitrile)) (WAKO Chemicals, VA) are dissolved in 50 mL EtAc (ethyl acetate) and placed into a separate container herein called the monomer solution. Next, 1 g of the silica-amine solution (in 45 mL THF) from above, is centrifuged at 2000-3000 rpm for 5 minutes and redispersed in 30 mL of ethyl acetate. This silica-amine solution in ethyl acetate is added together with the monomer solution from above to a 500 mL round bottom flask with a stir bar to form a reactant mixture. The reactant mixture is capped, sparged for 5 minutes, and heated at 50° C. for 16 hours. Then the reactant mixture is precipitated in a beaker with 400 mL of 80/20 of hexanes/EtAc to form a soil adsorbing composite according to the present invention. The soil adsorbing composite is then dried under vacuum for 16 hours and stored in the freezer at −10° C. This results in a dried soil adsorbing composite of the present invention.

c. Polymerize In Situ Example

All materials are supplied from Sigma-Aldrich, Milwaukee, Wis. unless otherwise noted.

3D—First 0.312 g methacrylamide, 8.8 g acrylamide, 0.1 g V-65B initiator (2'-azobis(2,4-dimethylpentanenitrile)) (WAKO Chemicals, VA) are dissolved in 130 mL water and placed into a separate container herein called the monomer solution. Next 1 g of the silica-amine solution (in 45 mL THF) from above, is centrifuged at 2000-3000 rpm for 5 minutes and redispersed in 30 mL of THF. This silica-amine solution in THF is added together with the monomer solution from above to a 500 mL round bottom flask with a stir bar to form a reactant mixture. The reactant mixture is capped, sparged for 5 minutes, and heated at 50° C. for 16 hours. Then the reactant mixture is precipitated in a beaker with 400 mL of 80/20 of hexanes/EtAc to form a soil adsorbing composite according to the present invention. The soil adsorbing composite is then dried at 50° C. for 16 hours and stored in the freezer at −10° C. This results in a dried soil adsorbing composite of the present invention.

Example 4

Preparing Free Radical Generating Source—Azo Compound (4-(Trityldiazenyl)Benzoic Acid Chloride)

To a round bottom flask is added 4 g of 4-hydrazinylbenzoic acid (available from Sigma Aldrich, Milwaukee Wis.), 50 mL of N,N-dimethylformamide (DMF) (available from Sigma Aldrich, Milwaukee Wis.) and 91.6 mL diisopropylethylamine (available from Sigma Aldrich, Milwaukee Wis.). To this solution is added 7.7 g trityl chloride (available from Sigma Aldrich, Milwaukee Wis.) and the solution is stirred 24 h at 22° C. under a calcium chloride (available from Sigma Aldrich, Milwaukee Wis.) drying tube. The solution is transferred to a separatory funnel and a 1:1 by volume solution of ethyl ether (available from Aldrich Chemical, Milwaukee, Wis., USA)/ethylacetate (available from Aldrich Chemical, Milwaukee, Wis., USA) (300 mL total) is added. The mixture is washed 3 times with 300 mL of 0.1M hydrochloric acid, once with 300 mL saturated sodium chloride solution and the organic layer is separated and dried (sodium sulfate). The solvent is removed in vacuo to provide the product as a red foam of 4-(2-tritylhydrazinyl)benzoic acid.

A solution of 2 g 4-(2-tritylhydrazinyl)benzoic acid in 130 mL acetic acid is stirred 16 hours at 21° C.±2° C. to ensure complete dissolution of the solid. To this solution is added 55 mg magnesium/ethylene diamine tetraceticacid complex (available from Aldrich Chemical, Milwaukee, Wis., USA), 12 mg sodium tungstate (available from Aldrich Chemical, Milwaukee, Wis., USA) (dissolved in 1 mL water), and then 0.563 mL of hydrogen peroxide (available from Aldrich Chemical, Milwaukee, Wis., USA) (30% wt). The solution is stirred for 12 hours at 21° C.±2° C., and diluted with 150 mL ethyl acetate (available from Aldrich Chemical, Milwaukee, Wis., USA). Water is added and then the product is extracted into the organic phase. The solvent is removed in vacuo and the residue is purified by chromatography silica (available from Aldrich Chemical, Milwaukee, Wis., USA), 5% methanol (available from Aldrich Chemical, Milwaukee, Wis., USA)/methylene chloride (available from Aldrich Chemical, Milwaukee, Wis., USA) to give the final product 4-(trityldiazenyl)benzoic acid (0.700 mg, 35%).

1.15 grams of 4-(trityldiazenyl)benzoic acid (from above) and 250 mL of anhydrous methylene chloride (available from Aldrich Chemical, Milwaukee, Wis., USA) are added to a pre-dried round bottom flask with an atmosphere of nitrogen sealed via septa. The solution is stirred and cooled to 0° C. After 10 minutes, 0.26 mL of oxalyl chloride (available from Aldrich Chemical, Milwaukee, Wis., USA) is added dropwise via syringe over a 10 minute period. After the addition is complete, 2 drops of anhydrous dimethylformamide (available from Aldrich Chemical, Milwaukee, Wis., USA) are added via syringe. The reaction is kept at 0° C. for an additional hour, and the solvents are removed via rotary evaporator under vacuum. The resulting yellow solid 4-(trityldiazenyl)benzoic acid chloride is kept under nitrogen atmosphere and used without further purification.

1 g of the silica-amine solution (in 45 mL THF) from Example 3, is added to a flask along with 1.0 grams of the 4-(trityldiazenyl) benzoic acid chloride. This is stirred for 4 hours at room temperature. and then centrifuged at 2000-3000 rpm for 5 min to isolate the functionalized silica particles (i.e., trityldiazenyl-amidofunctionalized silica particles). The supernatant is discarded, and the functionalized silica particles are redispersed in 300 mL of fresh ethyl acetate (ACS reagent, available from Sigma-Aldrich, Milwaukee, Wis.). This centrifugation-redispersion process is repeated twice more to ensure removal of free starting material and THF. After the second centrifuging step, the supernatant is decanted and the silica amine particles are collected and dried under vacuum at 23° C. for 1 hour to form a reactant product. The reactant product of this reaction is known herein as, tritylazenyl-amidofunctionalized silica particles, a functionalized particulate material.

Next, 50 mg of the tritylazenyl-amidofunctionalized silica particles from above is dissolved in 5 mL of ethyl acetate in a vial. 2.5 mL of dimethylacrylamide is then added to the vial. Without any further addition of free initiators, the vial is capped, and then sparged with inert gas for 5 minutes to form a reactant mixture. The reactant mixture is stirred at 65° C. for 16 hours to form soil adsorbing composites. The resulting soil adsorbing composites are then removed and precipitated with 20 mL of 80/20 of hexanes/ethyl acetate mixture, and then dried under vacuum at 23° C. The dried soil adsorbing composites are further dried at 100° C. to remove any remaining solvent and/or monomer if the soil adsorbing composites are highly gelled. This results in soil adsorbing composites of the present invention.

Example 5

Non-Limiting Synthesis Example of Pulp-Containing Soil Adsorbing Composites a. Preparing a Reactive Monomer 1.024 g glycidylmethacrylate (available from Sigma-Aldrich Chemical, Milwaukee, Wis., USA) and 4 L of acetone (available from Sigma-Aldrich Chemical, Milwaukee, Wis., USA) are combined, herein called GMA solution.

b. Preparing Monomers Capable of Forming a Soil Adsorbing Polymer 792.09 g acrylamide (available from Sigma-Aldrich Chemical, Milwaukee, Wis., USA), 11.98 g [3-(methacryloylamino)propyl]trimethyl ammonium chloride 50% aqueous solution (available from Sigma-Aldrich Chemical, Milwaukee, Wis., USA), 2.00 g acrylic acid (available from Sigma-Aldrich Chemical, Milwaukee, Wis., USA) and 794.05 g deionized water are placed into a separate container herein called the monomer solution.

c. Preparing Initiator Solution 10 g of 2,2'azobis(2-amidinopropane) di-hydro chloride (available from Sigma-Aldrich Chemical, Milwaukee, Wis., USA) and 100 mL of deionized water are placed into a separate container herein called the Initiator Solution.

d. Preparing Pulp-Containing Soil Adsorbing Composite

A pulp-containing soil adsorbing composite can be made as follows. Approximately 310 grams of Northern Softwood Kraft pulp (available from Weyerhaeuser Canada, Alberta, Canada) is equilibrated in a conditioned room at 21° C.±2° C. and 50%±2% humidity for 2 hours. The sample is weighed and a mass of 306.08 grams is obtained.

The pulp is added to the GMA solution and allowed to stand in the solution for approximately 5 minutes and then the excess fluid is decanted and a mass of the saturated pulp is obtained. The mass is 378.06 grams. The sample is placed on a screen and allowed to air dry for 16 hours. The sample is then placed in a polypropylene bag and then placed in a 50° C. oven for 3.5 hours.

5402.4 grams water and 345.6 grams of monomer solution are added to a bucket and the bucket and contents are heated to 50° C. The GMA treated pulp is then added to the diluted monomer solution. The solution is purged with argon at the rate of 5 mL/sec for 4 minute. During the 3rd minute of purging, 12 mL of the initiator solution is added to the bucket. The solution is capped after the argon purge and heating is maintained at 50° C. for 16 hours.

The contents of the bucket are poured into a filter funnel and the liquid portion is discarded. The solids are rinsed with 2 gallons of water. The pulp is placed into a 2 gallon container with 800 mL of a 1% w/v sodium bicarbonate solution. The samples are allowed to soak in this solution for 2 hours and filtered and then rinsed with fresh 1% sodium bicarbonate solution in a Buchner funnel. The soak and rinse are repeated twice more. The final soak and rinse uses deionized water. After the final rinse step, the pulp is placed in a CTCH room at 21° C.±2° C. and 50%±2% humidity for 48 hours to dry and equilibrate. Sample mass is then obtained (297.29 grams).

Example 6

Sol-Gel Reaction for Making a Particulate Material (Silica)-Containing Soil Adsorbing Composite 395 g silicate 3.3R commercially available with 36.2 wt % activity is mixed with 305 g deionized water to get a 20.5 wt % silicate 3.3R solution. 700 mL deionized water is added into a 2 L reactor, then 16 g of the 20.5 wt % silicate 3.3R solution is added into it as heel. The solution inside the reactor is then heated with a water bath set to 50° C. The solution is stirred with propeller with speed of 80 rpm. The rest of the 20.5 wt % silicate 3.3R solution above is added at a speed of 7.14 mL/min, and 76 g 50% $H_2SO_4$ solution is added at a speed of 0.83 mL/min. After 10 minutes, the solution becomes turbid, then 100 g 5% activity polyacrylamide terpolymer (99% wt acrylamide 0.75% wt MAPTAC and 0.25% wt acrylic acid) is added. The dosage speed is 1.25 mL/min. After 90 minutes, the addition of the silicate, $H_2SO_4$, and polyacrylamide terpolymer are finished at the same time. Then 38 g 50% $H_2SO_4$ is added within 10 minutes to quench the sol-gel reaction. A soil adsorbing composite-containing solution having a final pH of about 6 results from this reaction. The soil adsorbing composite-containing solution is stirred at the speed of 20 rpm for 1 hour to age the soil adsorbing composites. The soil adsorbing composite is filtered with a Buchner Funnel to get the wet cake form of the soil adsorbing composite. 300 g of the wet cake is placed into a 2 L beaker, then 1000 mL deionized water is added to wash the wet cake to remove free polyacrylamide terpolymer that is not associated with the soil adsorbing composite. The suspension is then filtered again with a Buchner Funnel to get the wet cake form of the soil adsorbing composite again.

Repeat wash procedure for 3 more times. Then dry the soil adsorbing composite in wet cake form in an oven at 65° C. for 48 hours. Next, grind the dry soil adsorbing composite with a KRUPS grinder for 2 minutes to produce ground soil adsorbing composite.

After grinding, the ground soil adsorbing composite is sieved using a Retsch autosieve machine AS20 for 5 minutes to produce different cut-sizes of the soil adsorbing composite (<75 μm, 75<150 μm, 150<250 μm, 250<425 μm, and 425<600 μm). Soil adsorbing composites with a cut-size of 600 μm or greater are ground and sieved again according.

Examples 7A-10B

Soil Adsorbing Composites

The components and amounts used in the following Examples are shown in Table 1 below.

TABLE 1

| Example | AAM (mg) | MBAA (mg) | Water (g) | V-50 (mg) | Inorganic Particulate Material | Inorganic Particulate Material Mass (g) |
|---|---|---|---|---|---|---|
| 7-A | 998 | 0.00 | 4.00 | 4.00 | Syloid | 0.999 |
| 7-B | 998 | 0.00 | 4.00 | 4.02 | none | 0.000 |
| 8-A | 999 | 0.00 | 4.00 | 4.04 | Silica Gel | 1.977 |
| 8-B | 998 | 0.00 | 4.00 | 4.03 | TiO2 | 2.000 |
| 9-A | 996 | 0.28 | 4.01 | 4.03 | none | 0.000 |
| 9-B | 1000 | 0.29 | 4.01 | 4.02 | Syloid | 1.251 |
| 10-A | 997 | 0.30 | 4.01 | 4.02 | Silica Gel | 1.967 |
| 10-B | 1000 | 0.30 | 4.02 | 4.03 | TiO2 | 2.001 |

AAM is acrylamide
MBAA is N,N-methylenebis(acrylamide)
V-50 is 2,2'-azobis(2-methylpropionamidine)dihydrochloride Example 7A Syloid 244FP Inorganic Particulate Material All chemical components in this Example 7A are available from Sigma Aldrich and are used as is unless otherwise noted. To a 16 mL reaction vessel equipped with stirring capability at ambient temperatures of approximately 20° C. to 25° C. add acrylamide, V-50 initiator, and water in the amounts listed in Table 2 below. Agitate the slurry and allow the solids to dissolve. Next add Syloid 244FP as the inorganic particulate material, available from W.R. Grace & Co. 7500 Grace Drive Columbia, Md. 21044 USA, in the amount listed in Table 1 above. Mix the slurry to form a homogeneous mixture. A magnetic stir flea available from Sigma Aldrich as item Z283789 is added and the reaction vessel is seated in a Thermofisher Scientific model TS-18823 heat and magnetic stirring apparatus, available from Thermo Fisher Scientific Inc. 81 Wyman Street Waltham, Mass. 02451 USA. The temperature is set for 50° C. and the stirring is set to setting 5. Sparge the slurry with inert gas at an approximate rate of 1 to 10 mL of inert gas every second for 3 minutes. Seal the reaction vessel to maintain the inert atmosphere. Allow the reaction vessel to heat and maintain stir setting for 20 hours. Note, once the material becomes sufficiently viscous, stirring will no longer occur, however the setting is not adjusted. The gelled material is removed from the reaction vessel after 20 hours and is manually cut into multiple pieces and dried in a forced air laboratory oven set at 60° C. for 20 hours. The dried material is then ground and the particulate sieved through a 250 micron mesh Example 7B No Inorganic Particulate Material This example is the same as Example 7A above, but no Syloid 244FP (inorganic particulate material) is added.

Example 8A

Silica Gel Inorganic Particulate Material

This example is the same as Example 7A above, but the Syloid 244FP (inorganic particulate material) is replaced with silica gel (inorganic particulate material) commercially available in the amount shown in Table 1 above.

Example 8B

Titanium Dioxide Inorganic Particulate Material

This example is the same as Example 7A above, but the Syloid 244FP (inorganic particulate material) is replaced with titanium dioxide (inorganic particulate material) commercially available in the amount shown in Table 1 above.

Example 9A

No Inorganic Particulate Material

This example is the same as Example 7B above, with the addition of N,N-methylenebis(acrylamide) to the monomer mixture directly after the addition of acrylamide in the amount listed in Table 1 above.

Example 9B

Syloid 244FP Inorganic Particulate Material

This example is the same as Example 9A with Syloid 244FP (inorganic particulate material) added in the amount listed in Table 1 above.

Example 10A

Silica Gel Inorganic Particulate Material

This example is the same as Example 9B, but the Syloid 244FP (inorganic particulate material) is replaced with silica gel (inorganic particulate material) commercially available in the amount listed in Table 1 above.

Example 10B

Titanium Dioxide Inorganic Particulate Material

This example is the same as Example 9B, but the Syloid 244FP (inorganic particulate material) is replaced with titanium dioxide (inorganic particulate material) commercially available in the amount listed in Table 1 above.

Table 2 below shows the Backscattering Values for the above examples of the soil adsorbing composites of the present invention.

TABLE 2

|  | % BS at 1 Minute | St Dev at 1 Minute | % BS at 2 Minutes | St Dev at 2 Minutes |
|---|---|---|---|---|
| 1A - Sieved < 100 microns | 9.22 | 0.08 | 9.38 | 0.08 |
| 1A - Sieved 100-200 microns | 9.07 | 0.09 | 8.83 | 0.07 |
| 1A - Sieved 200-300 microns | 11.93 | 0.12 | 11.41 | 0.11 |
| 1B | 10.56 | 0.1 | 10.14 | 0.08 |
| 1B - Sieved < 100 microns | 8.89 | 0.07 | 8.87 | 0.06 |
| 1B - Sieved 100-200 microns | 9.93 | 0.09 | 9.4 | 0.07 |
| 1B - Sieved 200-300 microns | 10.02 | 0.1 | 9.5 | 0.08 |
| 1B - Sieved > 300 microns | 12.92 | 0.11 | 12.2 | 0.09 |
| 2A |  |  |  |  |
| 2B | 9.08 | 0.07 | 8.9 | 0.06 |
| 2C | 13.77 | 0.13 | 12.89 | 0.13 |
| 2C - Sieved < 100 microns | 13.97 | 0.09 | 13.26 | 0.08 |
| 2C - Sieved 100-200 microns | 13.96 | 0.09 | 12.97 | 0.08 |
| 2C - Sieved 200-300 microns | 13 | 0.08 | 11.95 | 0.08 |
| 2C - Seived > 300 microns | 11.98 | 0.11 | 11.12 | 0.07 |
| 3A | 11.31 | 0.16 | 10.57 | 0.09 |
| 3C | 10.63 | 0.13 | 10.08 | 0.11 |
| 3D | 13.34 | 0.14 | 12.96 | 0.11 |
| 5 | 10.1 | 0.08 | 9.97 | 0.08 |
| 7A | 12.06 | 0.12 | 11.33 | 0.1 |
| 7B | 9.08 | 0.08 | 8.85 | 0.07 |
| 8A | 8.12 | 0.08 | 8.17 | 0.08 |
| 8B | 9.89 | 0.1 | 9.45 | 0.09 |
| 9A | 9.16 | 0.1 | 9.02 | 0.09 |
| 9B | 14.96 | 0.13 | 14.25 | 0.13 |
| 10A | 11.55 | 0.1 | 11.08 | 0.07 |
| 10B | 15.21 | 0.11 | 14.39 | 0.11 |
| Comparative Samples |  |  |  |  |
| Dirt only | 15.24 | 0.17 | 14.43 | 0.14 |
| Dirt + Silica (Untreated Particulate Material) | 16.74 | 0.15 | 15.98 | 0.17 |
| Dirt + Pulp (Untreated Particulate Material) | 17.19 | 0.87 | 16.46 | 0.74 |

Test Methods

Soil Flocculation and Settling Test Method

The Soil Flocculation and Settling Test Method is used to measure a material's Backscattering Value. The material may be any material, for example a soil adsorbing composite, neat or within a composition, such as a detergent composition.

Instrument

All measurements are taken in a lab where the temperature is 23°±2° C. and 50-70% relative humidity.

A Turbiscan™ LAB Thermo ("instrument") available from Formulaction SA (10 impasse Borde-Basse—31240 I'Union—France) or equivalent instrument which measures backscattered light (Backscattering Value) is used for testing the soil flocculation and settling.

The instrument has an electro luminescent diode in the near infrared ($\lambda air=880$ nm).

The instrument has two synchronous optical detectors, one which receives transmitted light at 180° from the incident light and one which receives backscattered light at 45° from the incident light.

The instrument has specially designed Sample Cells ("Sample Cell") that are flat bottomed glass cells (external diameter 27.5 mm, height 70 mm) with modified polycarbonate screwed top cap and butyl/Teflon sealing ring. Maximum volume within the Sample Cell is 22 mL. The materials to be tested must be inert in contact with glass and Teflon. The instrument scans the bottom 55 mm of the height of the Sample Cell, taking a measurement every 40 μm.

The incident light should hit the center of the Sample Cell so that it passes through 27.5 mm of material being tested.

The light beam which is 40 μm in size should pass through the material being tested for 0.1 seconds.

The instrument should be calibrated according to the manufacturer's instructions.

a. Soil

Black Todd Clay available from Empirical Manufacturing Company (7616 Reinhold Drive, Cincinnati, Ohio 45237-3208) or equivalent company is used for testing ("Soil").

b. Sample Cell Preparation

An empty, clean, Sample Cell specifically designed for the instrument is inspected to ensure no smudges or residues are present, and then handled with only gloved (nitrile examination gloves or equivalent) hands. If the Sample Cell is not empty, clean, smudge-free, residue-free, damage-free, then discard and get a new Sample Cell for use.

The Sample Cell is labeled with the specimen name on the cap, so that it will not interfere with the measurement, and tared.

0.1784 g±0.0005 g of the Soil is weighed (Weight$_{Soil}$) into the Sample Cell. The Sample Cell containing the Soil is re-tared.

Deionized water, 25.0 mL±0.2 mL, is added slowly to the Sample Cell using a suitable dispenser. The deionized water is added carefully to the Sample Cell containing the Soil to avoid loss or partial loss of the Soil caused by a plume of dust from the Soil within the Sample Cell. If a plume of dust occurs, the Sample Cell's contents are discarded, and a new Sample Cell is prepared.

The Sample Cell containing the deionized water/Soil mixture is re-weighed to within ±0.1 mg (Weight$_{Water}$).

The cap is then placed on Sample Cell. After ensuring the Sample Cell is capped, the deionized water/Soil mixture is mixed for 5 seconds±1 second at 3200 rpm (max speed) and an amplitude of 0.358 cm using a vortexer (Vortex Genie 2 or equivalent) to ensure the Soil is suspended in the deionized water within the Sample Cell.

The Sample Cell's cap is then removed and 44.6 mg of the material to be tested ("Test Sample"), such as a soil adsorbing composite comprising a soil adsorbing polymer, is immediately added to the Sample Cell.

The Sample Cell's cap is then immediately placed back onto the Sample Cell and the deionized water/Soil/Test Sample is immediately mixed for 5 seconds±1 second at 3200 rpm (max speed) and an amplitude of 0.358 cm using a vortexer (Vortex Genie 2 or equivalent) to ensure the Soil and the Test Sample are suspended in the deionized water within the Sample Cell.

The Sample Cell is then immediately [if this process (adding black todd clay to inserting Sample Cell into Turbiscan took more than 1 minute) then throw out and re-do the test] placed into the Instrument and the measurement is taken according to the Dynamic Test Sample Measurement Procedures as follows.

c. Dynamic Test Sample Measurement Procedure

1. Prior to Sample Cell Preparation (Step b above), turn on the Instrument and allow the system to warm up according to the manufacturer's instructions. 2. Dynamic Test Sample Measurements are taken as a scan up the Sample Cell (from the Sample Cell's bottom to a height along the Sample Cell of 55 mm) at each of: the initial time point (as soon as the Sample Cell is loaded into the test chamber of the Instrument) and a two minute time point.

3. The average percent backscatter (Backscattering Value) of a 10 mm height portion of the Sample Cell between 25 mm and 35 mm height from the bottom of the Sample Cell is recorded and reported. If a portion of the Test Sample is stuck to the glass between the 25 mm and 35 mm position, then discard and repeat the test for that Sample Cell.

4. Each condition is run in minimum triplicate and their average percent backscatter (Backscattering Value) from Step 3 above is then averaged to give the final Backscattering Value for that condition.

Particle Diameter Test Method

A particle's diameter is determined by using a Scanning Electron Microscope (SEM) or an Optical Microscope and an image analysis software. A magnification of 200 to 10,000 times is chosen such that the particles are suitably enlarged for measurement. When using the SEM, the particles are sputtered with gold or a palladium compound to avoid electric charging and vibrations of the particle in the electron beam. A manual procedure for determining the particle diameters is used from the image (on monitor screen) taken with the SEM or the optical microscope. Using a mouse and a cursor tool, the edge of a randomly selected particle is sought and then measured across the particle's largest dimension. A scaled and calibrated image analysis tool provides the scaling to get actual reading in µm.

Soil Adsorption Test Method

A rectilinear 3.00 inch×4.00 inch piece of a handsheet prepared and treated as set forth below is cut, if necessary, using a 3 inch×4 inch die cutter to provide a sample portion having a basis weight of from 19 g/m$^2$ to 33 g/m$^2$ (sample portions outside this range are discarded). All specimens are obtained from a portion of the test material at least 0.5 inches from any edges. The handsheet is labeled with the specimen name using a ball-point pen or equivalent marker. After the handsheet has been conditioned in the conditioned room at 70° F.±2° F. and a relative humidity of 50%±2% for at least 2 hours (preferably overnight), the handsheet is weighed to within ±10 mg (Weight$_{substrate}$) while still maintaining the conditioning conditions. The remainder of the work is done in a laboratory at a temperature of 73° F.±3.5° F. and a relative humidity <70%. The handsheet is then placed on a lattice (23.75"×47.75" polystyrene light panel manufactured by Plaskolite, Inc., Columbus, Ohio, available from Home Depot as model #1425005A; or equivalent lattice). Each handsheet is then treated with a total of 3.8 mL (in 1-4 aliquots to avoid oversaturation if necessary) of the 0.02% polymer solution prepared as described above or if the polymer solution being tested is less than 0.02%, then the total amount of the polymer solution to be added to each handsheet (in 1-4 aliquots to avoid oversaturation if necessary) is determined by the following equation:

$$AmountAdded(mL) = \frac{3.8 \text{ mL} * 0.02\%}{PercentSolids(\%)}$$

The polymer solution is applied to the upper (treated) side of the handsheet only. At least 1.5 hours between aliquots is given to allow the handsheet to at least partially dry. After application of all the polymer solution, the handsheet are left to air dry for at least 4 hours on the lattice.

Once the handsheet is dry, the handsheet is folded in half with the treated side facing in so that the handsheet forms a 1.5"×4" testing strip. An accordion style (paper fan) folding technique is then used to fold the testing strip 5 times to produce a testing strip that contains 6 segments each about ⅔" in width.

A Petri dish (VWR sterile Petri dish, Simport plastics, 60 mm×15 mm, 28 mL volume, VWR Catalog #60872-306) is labeled with the handsheet name and weighed to within ±1 mg (Weight$_{Dish}$).

A capped centrifuge tube containing a model soil and water prepared according to the Soil Solution Preparation set forth below is then agitated/shaken to disperse the model soil in the water to form a soil dispersion. The centrifuge tube is then uncapped permitting the testing strip to be fully immersed into the soil dispersion so that the folds of the testing strip run parallel to the length of the centrifuge tube. The centrifuge tube is then immediately re-capped and shaken in a WS 180° shaker for 60±1 seconds. The WS 180° shaker (Glas-Col #099AWS18012) is set at 50% speed so that it inverts the specimen 160-170° every 1 second.

After shaking, the testing strip is carefully removed over a Petri dish using laboratory tweezers. Care must be taken to ensure that all of the soil dispersion is kept either in the original centrifuge tube or corresponding Petri dish. The soil dispersion is wrung from the testing strip using a "wringing" motion and collected in the Petri dish (≥85% of the soil dispersion should be collected). Once the soil dispersion has been removed from the testing strip, the testing strip is discarded. The remaining soil dispersion is poured from the centrifuge tube into the Petri dish after swirling the mixture to re-disperse the model soil into the water, thereby ensuring that no model soil is inadvertently left behind in the centrifuge tube. The Petri dish containing the soil dispersion is weighed to within ±1 mg (Weight$_{Dish+Effluent}$). The Petri dish is then placed into a vented laboratory drying oven at 60° C. until the sample is dry, preferably overnight. Once the specimen is dry, the Petri dish is removed from the oven and allowed to cool to 73° F.±4° F. The Petri dish is then re-weighed to within ±1 mg (Weight$_{Dish+DriedSoil}$).

Soil Solution Preparation

A centrifuge tube (VWR brand 50 mL superclear ultra high performance freestanding centrifuge tube with flat cap, VWR Catalog #82018-052; or equivalent tube) is labeled with the specimen name and weighed to within ±1 mg (Weight$_{Vial+Cap}$). Next 0.1784 g±0.0005 g of a model soil (Black Todd Clay available from Empirical Manufacturing Co., 7616 Reinhold Drive, Cincinnati, Ohio 45237-3208) is weighed (Weight$_{Added\ Soil}$) and then placed into the centrifuge tube. Deionized water, 25.0 mL±0.2 mL, is added slowly to the centrifuge tube using a suitable dispenser. The deionized water is poured carefully into the centrifuge tube to avoid causing a plume of dust from the model soil. If a plume of dust occurs, the centrifuge tube is discarded and a new centrifuge tube is prepared. The centrifuge tube is then re-weighed to within ±1 mg (Weight$_{Vial+Cap+Dispersion}$).

Preparation of Handsheet

In order to test the soil adsorption properties of a material, such as a polymer, a handsheet is prepared as follows and is then used in the Soil Adsorption Test Method described above.

A handsheet is a handmade specimen of a fibrous structure. Handsheets are prepared at target basis weight of 26.8 g/m$^2$, but no less than 19 g/m$^2$ and no more than 33 g/m$^2$ using the following procedure.

a. Pulp Preparation

A pulp slurry of Northern Softwood Kraft (NSK) pulp is made as follows. Using an analytical balance capable of weighing to ±0.0002 g, weigh out 30 g of NSK dry lap (pulp). Record the weight of the NSK dry lap. Record the percent bone-dry pulp or consistency for this pulp. Put 500 mL of 23° C.±2° C. of City of Cincinnati, Ohio Water (or equivalent having the following properties: Total Hardness=155 mg/L as CaCO$_3$; Calcium content=33.2 mg/L; Magnesium content=17.5 mg/L; Phosphate content=0.0462) into a 2000 mL polypropylene beaker. Add the weighed NSK dry lap to the water in the beaker immediately following the addition of the water to the beaker. After the NSK dry lap is completely wetted (about 50-60 seconds), remove the wetted NSK dry lap and manually tear into small pieces of wetted NSK dry lap, approximately 2 cm$^2$ or less pieces. Add the small pieces of wetted NSK dry lap back into the water in the beaker. Let the wetted NSK dry lap soak in the water for at least 1 hour, typically 1-2 hours. At the end of the soaking period, transfer the contents of the beaker (water and pulp) to a disintegrator tank of a pulp disintegrator commercially available from Testing Machines, Inc. under the tradename 73-18 Pulp Disintegrator or its equivalent. Follow the manufacturer's instructions for maintaining, calibrating, and cleaning the disintegrator, as needed. The disintegrator must meet TAPPI Standard T-205. Using more of the City of Cincinnati, Ohio water (or equivalent water as described above) delivered by a polyethylene wash bottle, wash and remove any remaining pulp adhering to the beaker into the disintegrator tank. Additional City of Cincinnati, Ohio water (or equivalent water as described above) is added to the disintegrator tank to result in a total of 1500 mL of total volume in the disintegrator tank.

Next, place the disintegrator tank containing the pulp and City of Cincinnati, Ohio water (or equivalent water as described above) (23° C.±2° C.) on the disintegrator's platform and position it under the shaft and impeller blade of the disintegrator. Clamp the disintegrator tank firmly in place on the disintegrator's platform. Lower the impeller blade into position and lock in place according to the manufacturer's instructions. Put the disintegrator tank's lid in place on the disintegrator tank. Set an interval timer with timed switch outlet for exactly 10 minutes. Turn the disintegrator on and start the timer with the alarm on the timer turned on such that the alarm sounds and the disintegrator turns off automatically after exactly 10 minutes of operation. Turn the alarm off. Use the pulp slurry (pulp plus City of Cincinnati, Ohio water (or equivalent water as described above)) in the disintegrator within an hour after the completion of the 10 minutes of operation. Do not let the pulp slurry stand idle for more than an hour before using it to make the handsheets.

b. Proportioning of Pulp

After the pulp slurry is prepared in the disintegrator tank as described above, the pulp slurry is then proportioned in a proportioner, such as a Noble and Wood Handsheet Forming Machine or a proportioner and handsheet forming machine, which is commercially available from Adirondack Machine Corporation as follows.

To a proportioner having a 19-21 L stainless steel tank, City of Cincinnati, Ohio water (or equivalent water as described above) is added to fill the tank to about half full (about 9-10 L). The agitator of the proportioner is turned on and the speed of the agitator is adjusted to 23 rpm±2 rpm to provide good mixing once the pulp slurry is added. Good mixing can be determined by seeing that the pulp slurry is evenly mixing with the City of Cincinnati, Ohio water (or equivalent water as described above) that is added to the tank. Next, add the equivalent of 30 g of bone-dry pulp of the pulp slurry produced above to the tank. After addition of the pulp slurry to the tank, set the volume scale of the proportioner to the 19 L mark. Add additional City of Cincinnati, Ohio water (or equivalent water as described above) to make the liquid level approximately even with the top of the hook on the solution indicator pointer of the proportioner.

c. Forming Handsheet

A handsheet is made from the pulp slurry present in the proportioner, described above, as follows.

The handsheet is made using a 12"×12" stainless steel sheet mold commercially available from Adirondack Machine Corporation. First, open the drain valve on the deckle box of the sheet mold and completely drain the deckle box. The deckle box needs to be clean and free of contaminants. Close the drain valve and open the deckle box. Turn on the water supply, City of Cincinnati, Ohio water (or equivalent water as described above) and allow the deckle box to overflow. Place a clean forming wire (84M 14"×14" polyester monofilament plastic cloth, commercially available from Appleton Wire Co.), on the coarse deckle box wire so as not to entrap any air bubbles under the forming wire. If air bubbles persist, eliminate by rubbing the wire gently with hands before closing the deckle box. Air bubbles under the forming wire, if not removed, will cause holes in the handsheet and makes the handsheet unacceptable for use in the tests described herein.

After the forming wire has been thoroughly wetted by the water, close and lock the deckle box and allow the water to rise to 8½" from the forming wire in the deckle box. A mark on the inside of the deckle box should be used to permanently indicate this volume. Add 2543 mL of the pulp slurry from the proportioner to the water in the deckle box using the proportioner sample container. Using the perforated metal deckle box plunger, distribute the pulp slurry uniformly by moving the plunger from near the top of the pulp slurry to the bottom of the pulp slurry within the deckle box and back for three complete up and down cycles. Do not touch the forming wire on the downward strokes. After the third cycle, bring the plunger up and pause for two seconds holding the plunger plate just beneath the pulp slurry surface (to eliminate wave action) and then withdraw slowly. Make sure that the pulp slurry is undisturbed in the deckle box.

Depress the switch to activate the timed opening of the drop valve of the deckle box. The drop valve will close automatically after the deckle box is completely drained. Most units completely drain in about 20-25 seconds. After the drop valve closes, open the deckle box and carefully remove the forming wire with fiber mat side up from the deckle box. Immediately place the forming wire with fiber mat side up on a vacuum box's surface (a vacuum box table) having a surface at a vacuum slot (13"×1/16" 90° flare) over which the forming wire with fiber mat passes. Keep the edge of the forming wire which is next to the operator in the same relative position during this transfer from the deckle box to the vacuum box table.

The vacuum box table's vacuum valves are set such that the low level of vacuum (pre-vacuum) peaks at 4.0±0.5" Hg and the high level vacuum peaks at 10.0±0.5" Hg according to an Ashcroft Vacuum Gauge Model 1189, range 0-15" Hg commercially available from Ashcroft Inc.

Turn on the vacuum pump (a Nash H4 Pump with a draw of 106 cfm Motor-10 HP, 1745 rpm, 3 Ph, 60 Hz available from ECM Inc.) associated with the vacuum box table. Engage the low level vacuum (pre-vacuum). Position the forming wire with the fiber mat side up on the vacuum box table so that the front edge of the forming wire (edge next to the operator) extends over the vacuum slot about 1/4"-1/2". Pull the forming wire with fiber mat across the vacuum slot in 1±0.3 seconds at a uniform rate. The vacuum gauge should peak at 4.0±0.5" Hg. This step is referred to as the Pre-vacuum Step.

Next, turn the low level vacuum and open the high level side of the vacuum system. Place the knubby side up of a transfer wire (44M 16"×14" polyester monofilament plastic cloth commercially available from Appleton Wire Co. with the knobby side, which is the sheet side, marked with an arrow indicating the machine direction) on the vacuum box table behind the vacuum slot. The transfer wire is placed on the vacuum box table such that the 16" length is perpendicular to the vacuum slot. Carefully turn the forming wire with the fiber mat over keeping the edge of the forming wire, which has been next to the operator, in the same relative position. Gently place the forming wire with fiber mat onto the center of the transfer wire, forming a "sandwich" so that the front edge of the transfer wire (edge next to the operator) extends over the vacuum slot about 1/4"-1/2". The direction of travel of the fiber mat over the vacuum slot must be identical to the direction of travel of the forming wire with fiber mat during the Pre-vacuum Step described above. The "sandwich" is pulled across the vacuum slot in 1±0.3 seconds at a uniform rate. The vacuum gauge should peak at 10.0±0.5" Hg. This step, which transfers the fiber mat from the forming wire to the transfer wire, is called the Transfer Vacuum Step.

Close the high level vacuum and turn off the entire vacuum system. By this time the fiber mat has become a handsheet. Next, place the "sandwich" on the vacuum box table. Separate the forming wire from the handsheet and the transfer wire by gently lifting one corner of the forming wire and removing it, leaving the handsheet attached to the transfer wire. Keep the edge of the fabric next to the operator in the same relative position as the handsheet as it was during the Transfer Vacuum Step. Make an arrow with an indelible pencil (a water color pencil commercially available from Dick Blick Art Supplies) on a corner of the handsheet to indicate the direction of travel across the vacuum slot. This identifies the handsheet's machine direction.

Next, pass the transfer wire with the handsheet attached through an E-100 Drum Dryer commercially available from Adirondack Machine Corporation with the transfer wire next to the drum dryer and with the edge that was kept next to the operator going into the drum dryer last. Pass the transfer wire with the handsheet attached through the drum dryer a second time with the handsheet next to the drum dryer.

The handsheet is removed immediately after exiting the dryer drum the second time while it is still warm.

The handsheet formed must be at a target basis weight of 26.8 g/m², but no less than 19 g/m² and no more than 33 g/m² suitable for testing. If the basis weight is less than 19 g/m² or greater than 33 g/m² then either the amount of pulp is too small or too large and the process needs to be adjusted accordingly to produce a handsheet with a target basis weight of 26.8 g/m², but no less than 19 g/m² and no more than 33 g/m².

Calculations

To calculate the amount of residual model soil ($Mass_{Residual\ Soil}$) left in the Petri dish, the following equation is used:

$$Mass_{ResidualSoil} = Weight_{Dish+DriedSoil} - Weight_{Dish}$$

Residual model soil is reported in mg.

To calculate the amount of soil adsorbed (Soil Retained) in the specimen, the following calculation is used:

$$SoilRetained = Weight_{AddedSoil} - Mass_{ResidualSoil}$$

The amount of soil adsorbed is reported in mg.

To calculate the percent of soil retained (% Soil Retained), the following calculation is used:

$$\%\ Soil\ Retained = \left[\frac{Soil\ Retained}{Weight_{AddedSoil}}\right] * 100\%$$

The test is performed on four replicates and the average amount of soil adsorbed (also known as the Soil Adsorption Value) and the average percent of soil retained (% Soil Retained$_{avg}$) are calculated for the material.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A soil adsorbing composite comprising one or more soil adsorbing polymers wherein the soil adsorbing composite exhibits a Backscattering Value of less than 14% after 2 minutes as measured according to the Soil Flocculation and Settling Test Method.

2. The soil adsorbing composite according to claim 1 wherein the soil adsorbing composite exhibits a Backscattering Value of less than 12% after 2 minutes as measured according to the Soil Flocculation and Settling Test Method.

3. The soil adsorbing composite according to claim 1 wherein the soil adsorbing composite exhibits a Backscattering Value of less than 15% after 1 minute as measured according to the Soil Flocculation and Settling Test Method.

4. The soil adsorbing composite according to claim 1 wherein the soil adsorbing composite exhibits a particle diameter of from about 75 µm to about 500 µm as measured according to the Particle Diameter Test Method.

5. The soil adsorbing composite according to claim 1 wherein at least one of the particulate materials is selected from the group consisting of: silica, titanium dioxide, pulp, and mixtures thereof.

6. The soil adsorbing composite according to claim 5 wherein the particulate material is silica.

7. The soil adsorbing composite according to claim 1 wherein at least one of the particulate materials exhibits a particle diameter of from about 1 µm to about 20 µm as measured according to the Particle Diameter Test Method.

8. The soil adsorbing composite according to claim 1 wherein the soil adsorbing polymer is derived from one or more monomers capable of forming a soil adsorbing polymer such that that soil adsorbing composite exhibits a Soil Adsorption Value of at least 38 mg as measured according to the Soil Adsorption Test Method.

9. The soil adsorbing composite according to claim 8 wherein at least one of the one or more monomers is selected from the group consisting of: α,β-ethylenically unsaturated non-charged amide or derivative monomers, α,β-ethylenically unsaturated acid monomers, quaternary ammonium-containing monomers, and mixtures thereof.

10. The soil adsorbing composite according to claim 9 wherein the α,β-ethylenically unsaturated non-charged amide (acrylamide monomers) or derivative monomers are selected from the group consisting of: acrylamide, N,N-dimethylacrylamide, N,N-dimethylmethacrylamide, N-methylolacrylamide, α,β-ethylenically unsaturated, and mixtures thereof.

11. The soil adsorbing composite according to claim 9 wherein the α,β-ethylenically unsaturated acid monomers are selected from the group consisting of: acrylic, methacrylic or maleic acids or anhydrides, fumaric acid, itaconic acid, N-methacroylalanine, 2-carboxyethyl acrylate (CEA), N-acryloylglycine, and their water-soluble salts, monomers that are precursors of carboxylate functions, such as tert-butyl acrylate, which, after polymerization, give rise to carboxylic functions by hydrolysis, monomers having at least one sulfate or sulfonate function, such as 2-sulfooxyethyl methacrylate, vinylbenzene sulfonic acid, allyl sulfonic acid, 2-acrylamido-2-methylpropane sulfonic acid (AMPS), sulfoethyl acrylate or methacrylate, sulfopropyl acrylate or methacrylate, and their water-soluble salts, monomers having at least one phosphonate or phosphate function, such as vinylphosphonic acid, etc., the esters of ethylenically unsaturated phosphates, such as the phosphates derived from hydroxyethyl methacrylate (Empicryl 6835 from Rhodia) and those derived from polyoxyalkylene methacrylates, and their water-soluble salts, and mixtures thereof.

12. The soil adsorbing composite according to claim 9 wherein the quaternary ammonium-containing monomers are selected from the group consisting of: trimethylammonium propyl methacrylate chloride, trimethylammonium ethylacrylamide or -methacrylamide chloride or bromide, trimethylammonium butylacrylamide or -methacrylamide methyl sulfate, trimethylammonium propylmethacrylamide methyl sulfate, (3-methacrylamidopropyl)trimethylammonium chloride (MAPTAC), (3-methacrylamidopropyl)trimethylammonium methyl sulphate (MAPTA-MES), (3-acrylamidopropyl)trimethylammonium chloride (APTAC), methacryloyloxyethyl-trimethylammonium chloride or methyl sulfate, and acryloyloxyethyltrimethylammonium chloride; 1-ethyl-2-vinylpyridinium or 1-ethyl-4-vinylpyridinium bromide, chloride or methyl sulfate; N,N-dialkyl-diallylamine monomers such as N,N-dimethyldiallylammonium chloride (DADMAC); polyquaternary monomers such as dimethylaminopropylmethacrylamide chloride and N-(3-chloro-2-hydroxypropyl)trimethylammonium (DIQUAT or DQ) and 2-hydroxy-$N^1$-(3-(2((3-methacrylamidopropyl)dimethylamino)-acetamido)propyl)-$N^1$, $N^1$, $N^3$, $N^3$, $N^3$-pentamethylpropane-1,3-diaminium chloride (TRIQUAT or TQ), [tertiary amino monomers (not quats)] and mixtures thereof.

* * * * *